(12) United States Patent
Akiyoshi

(10) Patent No.: US 7,760,693 B2
(45) Date of Patent: Jul. 20, 2010

(54) PACKET DISTRIBUTION SYSTEM, PAN REGISTRATION DEVICE, PAN CONTROL DEVICE, PACKET TRANSFER DEVICE, AND PACKET DISTRIBUTION METHOD

(75) Inventor: Ippei Akiyoshi, Minato-ku (JP)

(73) Assignee: NEC Corporation, Tokyo (JP)

( * ) Notice: Subject to any disclaimer, the term of this patent is extended or adjusted under 35 U.S.C. 154(b) by 1228 days.

(21) Appl. No.: 11/295,585

(22) Filed: Dec. 7, 2005

(65) Prior Publication Data

US 2006/0126649 A1    Jun. 15, 2006

(30) Foreign Application Priority Data

Dec. 10, 2004   (JP)   ............................. 2004-359035
Mar. 4, 2005    (JP)   ............................. 2005-061109

(51) Int. Cl.
H04L 12/56     (2006.01)
H04W 4/00      (2009.01)

(52) U.S. Cl. .................. 370/338; 370/401; 370/395.53; 370/428

(58) Field of Classification Search ................. 370/349, 370/254, 338, 352, 401, 428, 395.52; 455/41, 455/41.2, 323; 709/249
See application file for complete search history.

(56) References Cited

U.S. PATENT DOCUMENTS

| | | | |
|---|---|---|---|
| 6,636,498 | B1   | 10/2003 | Leung |
| 6,795,688 | B1 * | 9/2004  | Plasson et al. ............. 455/41.2 |
| 2002/0087371 | A1 * | 7/2002 | Abendroth ..................... 705/7 |
| 2002/0129170 | A1 * | 9/2002 | Moore et al. ................ 709/249 |
| 2002/0196771 | A1 * | 12/2002 | Vij et al. ..................... 370/349 |
| 2003/0027525 | A1 * | 2/2003 | Moore et al. .................. 455/41 |
| 2003/0161287 | A1   | 8/2003 | Venkitaraman et al. |
| 2004/0109197 | A1 * | 6/2004 | Gardaz et al. .............. 358/1.15 |
| 2004/0196854 | A1   | 10/2004 | Thubert et al. |
| 2004/0246909 | A1 * | 12/2004 | Ahn .......................... 370/252 |
| 2005/0078608 | A1 * | 4/2005 | Gluck ........................ 370/254 |
| 2005/0147071 | A1 * | 7/2005 | Karaoguz et al. ........... 370/338 |

(Continued)

FOREIGN PATENT DOCUMENTS

JP          2003-8585 A         1/2003

(Continued)

OTHER PUBLICATIONS

A Seamless Coordinator switching (SCS) scheme for wireless personal area network; WS Kim, IW Kim, SE Hong, CG- IEEE Transactions on 2003.*

(Continued)

*Primary Examiner*—Salman Ahmed
(74) *Attorney, Agent, or Firm*—Sughrue Mion, PLLC

(57) ABSTRACT

The packet distribution system according to the present invention includes communication terminals that are connected by way of at least one link to a mobile network, a PAN registration device for holding communication link identification addresses that correspond to communication terminals on a PAN, and a PAN control device for conferring PAN identification addresses to a PAN registration device and realizing control. By referring to media information of packet data that are addressed to a PAN that are received by way of the mobile network, the packet data are transferred to communication link identification address destinations that correspond to the media information based on packet transfer rules that are received from the PAN control device.

24 Claims, 26 Drawing Sheets

U.S. PATENT DOCUMENTS

| | | | |
|---|---|---|---|
| 2005/0164670 A1* | 7/2005 | Sorrells et al. | 455/323 |
| 2005/0232242 A1* | 10/2005 | Karaoguz et al. | 370/352 |
| 2006/0126649 A1* | 6/2006 | Akiyoshi | 370/401 |
| 2007/0254604 A1* | 11/2007 | Kim | 455/88 |
| 2010/0037071 A1* | 2/2010 | Chang | 713/310 |

FOREIGN PATENT DOCUMENTS

| | | |
|---|---|---|
| JP | 2003-76600 A | 3/2003 |
| JP | 2004-509539 A | 3/2004 |
| JP | 2004-128926 A | 4/2004 |
| JP | 2004-135047 A | 4/2004 |
| WO | WO 02/23362 A1 | 3/2002 |
| WO | WO 03/065654 A1 | 8/2003 |
| WO | WO 03/098881 A1 | 11/2003 |
| WO | WO 2004/006486 A2 | 1/2004 |
| WO | 2004/105272 A1 | 12/2004 |

OTHER PUBLICATIONS

Development of PAN (personal area network) for Mobile Robot Using Bluetooth Transceiver Choo, S. H and H. M. Amin, Shamsudin and Fisal, Norsheila and Yeong, C. F. (2003) Development of PAN (personal area network) for Mobile Robot Using Bluetooth Transceiver. Research and Development, 2003. Scored 2003. Proceedings. Student Conference on . pp. 160-161.*

An approach for location area planning in a personal communication services network (PCSN) Bhattacharjee, P.S.; Saha, D.; Mukherjee, A.; Wireless Communications, IEEE Transactions on vol. 3 , Issue: 4 Digital Object Identifier: 10.1109/TWC.2004.830821 Publication Year: 2004 , pp. 1176-1187.*

V. Devarapalli, et al.; "Network Mobility (NEMO) Basic Support Protocol"; IETF Internet Draft; Dec. 2003; pp. 1-38.

V. Devarapalli, et al. "Network Mobility (NEMO) Basic Support Protocol," Network Working Group, Jan. 2005.

V. Devarapalli, et al. "Network Mobility (NEMO) Basic Support Protocol Draft-IETF-NEMO-Basic-Support-03.TXT," Internet Draft, NEMO Working Group, Jun. 2004.

* cited by examiner

| PAN identifier | PAN identification address | terminal identification address | communication link identification address | communication link type |
|---|---|---|---|---|
| PAN A | IP_PAN#A | IPha#111 | IPra#111 | W-CDMA |
| | | IPha#112 | IPra#112 | WLAN |
| | | IPha#113 | Null | Null |
| | | ... | ... | ... |

PAN information — 93
94 (communication link identification address column)
91 (PAN identification address)
92 (PAN identifier)

(b)

| PAN identifier | PAN identification address | terminal identification address | communication link identification address | communication link type |
|---|---|---|---|---|
| PAN B | IP_PAN#B | IPha#114 | IPra#114 | W-CDMA |
| | | | IPra#115 | WLAN |
| | | ... | ... | ... |

(c)

| PAN identifier | PAN identification address | terminal identification address | communication link identification address | communication link type |
|---|---|---|---|---|
| PAN C | IP_PAN#C | HoA#x | CoA#x | W-CDMA |
| | | ... | ... | ... |

Fig. 8

| destination PAN identification address | distribution source IP address | port number of distribution source | distribution destination terminal identification address | communication link identification address | port number | media information (payload type) |
|---|---|---|---|---|---|---|
| IP_PAN#A | IPda#150 | 1234 | IPha#113 | IPra#111 | 3456 | 0 |
| IP_PAN#A | IPda#151 | 1235 |  | IPra#112 | 2232 | 31 |
| IP_PAN#B | IPda#150 | 1234 | IPha#111 | IPra#111 | 3456 | 0 |
|  |  |  | IPha#114 | IPra#114 | 4568 | 0 |
|  |  |  |  | IPra#115 | 2468 | 31 |
| IP_PAN#C | IPda#151 | 1235 | HoA#x | CoA#x | 1357 | 0 |
| ... | ... | ... | ... | ... | ... | ... |

Fig. 13

```
RTSP/1.0 200 OK
CSeq : 312
 .
 .
 .
M=audio 3456 RTP/AVP 0
M=video 2232 RTP/AVP 31
 .
 .
 .
 .
```

PACKET DISTRIBUTION SYSTEM, PAN REGISTRATION DEVICE, PAN CONTROL DEVICE, PACKET TRANSFER DEVICE, AND PACKET DISTRIBUTION METHOD

BACKGROUND OF THE INVENTION

1. Field of the Invention

The present invention relates to a packet distribution system, and more particularly to a packet distribution system for distributing packets to terminal devices on personal area networks that are connected by way of a plurality of communication links to a mobile network.

2. Description of the Related Art

As a means of forming private networks, we have seen in recent years the introduction of ad hoc networks that are configured by realizing direct asynchronous radio communication between terminal devices, or personal area networks (hereinbelow referred to as "PAN") in which terminal devices that conform to the standards of IEEE 802.15 are connected by short-range radio such as Bluetooth.

One means of connecting these private networks to mobile networks is the protocol known as "Network Mobility (NEMO)" that is described in a non-patent document: Vijay Devarapalli, et al. "Network Mobility (NEMO) Basic Support Protocol" [online] June 2004, IETF (The Internet Engineering Task Force) Searched on Feb. 22, 2005. NEMO is a protocol for connecting a network that is constructed by the collection of a plurality of communication terminals to the Internet by way of mobile routers. The operation of NEMO is explained below with reference to FIG. 1 and FIG. 2.

NEMO is equipped with: Home Agent (communication terminal) 40, Home Agent (mobile router) 30, communication terminal 10, and mobile router 20. Referring to FIG. 1, the flow of control packets in NEMO is shown. Home Agent (communication terminal) 40 is a node for controlling communication terminal 10. Home Agent (mobile router) 30 is a node for controlling mobile router 20. When mobile router 20 receives a router advertisement from router 50 that is connected to Internet 500 and thus detects that it has moved to the subnet of prefix #1 (Operation A1), mobile router 20 uses prefix #1 to prepare a Care-of address (CoA), transmits a Binding Update to Home Agent (mobile router) 30 and reports the correspondence between the CoA and the Home Address (HoA) of mobile router 20 (Operation A2). Home Agent (mobile router) 30, having received the Binding Update, makes settings such that packets addressed to the home prefix of mobile router 20 are transferred to the CoA address of mobile router 20. When communication terminal 10 next receives a router advertisement from mobile router 20 and thus detects movement to the subnet of prefix #2, which is the home prefix of mobile router 20 (Operation A3), communication terminal 10 uses prefix #2 to prepare a CoA, transmits a Binding Update to Home Agent (communication terminal) 40, and reports the correlation between the CoA and the HoA of communication terminal 10 (Operation A4). Upon receiving the Binding Update, Home Agent (communication terminal) 10 makes settings such that packets addressed to HoA of communication terminal 10 are transferred to the address of CoA of communication terminal 10.

Next, FIG. 2 shows the flow of packets in NEMO. When packets are transmitted from communication partner terminal 60 to communication terminal 10, the packets are transmitted addressed to the HoA of communication terminal 10. Home Agent (communication terminal) 40, upon receiving the packets addressed to the HoA of communication terminal 10, tunnels to the CoA address of communication terminal 10 that has the home prefix of mobile router 20 and transfers the packets. Home Agent (mobile router) 30, upon receiving the CoA address of communication terminal 10, tunnels to the CoA address of mobile router 20 and transfers the packets. Mobile router 20, having received the packets, decapsulates the packets, and transfers the packets to communication terminal 10. Movement in a network is thus enabled in NEMO.

In mobile networks in recent years, users are not limited to using portable telephones as mobile terminals but have at their disposal a plurality of mobile terminals such as notebook computers and PDAs and use a variety of mobile terminals to fit particular purposes. As a consequence of this trend, when the above-described plurality of communication terminals is used to build a private area network, a private area network is formed that has a plurality of communication links with mobile networks. However, in a packet transfer method of the prior art such as NEMO, it is not possible to set a plurality of packet transfer paths to one mobile terminal that is present in a particular subnet in a Home Agent, and it is therefore not possible to simultaneously select a plurality of radio communication links to one communication terminal in a PAN and transfer packets.

Already existing communication links have various characteristics depending on the communication link, some links having an extensive communication coverage area but narrow communication bandwidth, as in W-CDMA, and other links having a scattered communication coverage area but a broad communication bandwidth. Thus, various links exist according to the nature of use of each application, W-CDMA being suitable as a communication link for cases in which the communication time is relatively lengthy and the communication bandwidth is narrow, as in VoIP, while a communication link having broad bandwidth such as a wireless LAN is suitable for an application for communicating in bursts of voluminous data such as the download of a music file. Preferably, a communication link that accords with the application is selected and packets transferred to a communication terminal in a PAN that is connected to a mobile network, and a plurality of communication links that accord with applications are simultaneously selected and packets transferred to one communication terminal in a PAN.

SUMMARY OF THE INVENTION

It is an object of the present invention to provide a packet distribution system, PAN registration device, a PAN control device, and a packet transfer device that allow the use of a plurality of communication links to distribute packets to communication terminals on a personal area network.

It is another object of the present invention to provide a packet distribution system, a PAN registration device, a PAN control device, a packet transfer device, and a packet distribution method that allow the use of communication links that depend on the application to transfer packets to communication terminals on a personal area network.

In the following explanation of the means for solving the problem, the numerals and codes that are used in the "Detailed Description of the Preferred Embodiments" are enclosed in parentheses. These numerals and codes have been added to clarify the correspondence between the description in the "Patent Claims" and the description in the "Detailed Description of the Preferred Embodiments," and these numerals and codes must not be used in interpreting the technical scope of the present invention that is described in the "Patent Claims."

The packet distribution system according to the present invention is provided with: a network (200); first communication terminals (1, 1-1, 1-2) that are connected by way of one or more links (300) to the network (200); and a packet transfer device (4) that is connected to the network (200), for determining links (300) that correspond to payload information (95) of packet data that are received by way of a network (100), and for transferring data to the first communication terminals (1, 1-1, 1-2) by way of the links (300).

The packet distribution system is provided with: a personal area network (100) (hereinbelow abbreviated "PAN") that is connected to the first communication terminals (1, 1-1, 1-2); a PAN registration device (2) that is connected to the PAN (100) and that acquires communication link identification addresses (94) from the first communication terminals (1, 1-1, 1-2) by way of the PAN (100); and a PAN control device (3) that is connected to the network (200). The PAN registration device (2) is connected to the PAN control device (3) by way of the network (200), and transmits the communication link identification addresses (94); and the PAN control device (3) prepares packet transfer rules (90) that place the communication link identification addresses (94) in correspondence with the payload information (95) and transmits to the packet transfer device (4). Packet transfer device (4) refers to these packet transfer rules (90) as packet transfer settings, designates as the destination address the communication link identification address (94) that corresponds to the payload information (95) of the packet data that is received by way of network (200), encapsulates the packet data, and transfers the packet data to the first communication terminals (1, 1-1, 1-2) by way of the link (300) that corresponds to the communication link identification address (94).

In addition, the PAN registration device (2) confers terminal identification addresses (93) to the first communication terminals (1, 1-1, 1-2) by way of the PAN (100), acquires PAN identification addresses (91) that are specific to the PAN (100) from the PAN control device (3) by way of the network (200), and carries out PAN registration to the PAN control device (3). The PAN registration device (2) transmits the terminal identification addresses (93) to PAN control device (3); and the PAN control device (3) prepares packet transfer rules (90) that place the PAN identification address (91) that was assigned to the PAN registration device, the terminal identification addresses (93), and the payload information (95) in correspondence; and transmits these packet transfer rules 90 by way of the network (200) to the packet transfer device (4).

The packet transfer device (4) refers to the packet transfer rules (90) as packet transfer settings, and when the destination addresses of packet data that are received by way of the network (200) match with the PAN identification addresses (91), converts the destination addresses to the terminal identification addresses (93) that correspond to the PAN identification addresses (91), designates as the destination addresses the communication link identification addresses (94) that correspond to the PAN identification addresses (91) and the payload information (95), encapsulates the packet data for which the destination addresses have been altered, and transfers the packet data to the first communication terminals (1, 1-1, 1-2) by way of the links (300) that accord with the communication link identification addresses (94).

The packet distribution system according to the present invention is further equipped with communication partner terminals (6 and 6') that: are connected to a network (100) for transmitting to the packet transfer device (4) packet data in which the PAN identification addresses are designated as the destination addresses, and the communication partner terminal addresses, which are their own addresses, are designated as the source addresses.

The communication partner terminals (6 and 6') transmit communication partner terminal addresses as session information to the PAN registration device by way of the network (200); and the PAN registration device (2) places the PAN identification addresses (91), the terminal identification addresses (93), and the communication partner terminal addresses in correspondence and transmits to the PAN control device (3). The PAN control device (3) prepares packet transfer rules in which the PAN identification addresses (91), terminal identification addresses (93), and communication partner terminal addresses are placed in correspondence, and transmits these packet transfer rules by way of the network (200) to the packet transfer device (4).

The packet transfer device (4) refers to the packet transfer rules (90) as transfer settings; converts the destination addresses to terminal identification addresses (93) that correspond to the PAN identification addresses (91) that match with the destination addresses of packet data that are received by way of the network (200) and the communication partner terminal addresses that match with the source addresses of the packet data; designates, as the destination addresses, the communication link identification addresses (94) that correspond to these PAN identification addresses (91), the communication partner terminal addresses, and the payload information (95); encapsulates the packet data for which the destination addresses have been altered; and transfers the packet data to the first communication terminals (1, 1-1, and 1-2) by way of links that accord with the communication link identification addresses (94).

In addition, second communication terminals (1, 1-3) that are connected to the PAN (100) are further provided; and the first communication terminals (1, 1-1, and 1-2) decapsulate the encapsulated packet data that are received by way of links (300) and refer to the destination addresses; and, based on the terminal identification addresses that are the destination addresses, transfer the decapsulated packet data to second communication terminals (1 and 1-3) by way of the PAN (100).

As described in the foregoing explanation, a packet distribution system is realized that is capable of simultaneously selecting a plurality of communication links to communication terminals (1, 1-1, 1-2, and 1-3) that are present within a PAN (100) and distributing packets.

The packet distribution system, PAN registration device, PAN control device, packet transfer device, and packet transmission method according to the present invention can use a plurality of communication links to communication terminals on a personal area network to distribute packets.

In addition, packets can be transmitted to communication terminals on a personal area network using communication links that accord with an application.

The above and other objects, features, and advantages of the present invention will become apparent from the following description with reference to the accompanying drawings, which illustrate examples of the present invention.

BRIEF DESCRIPTION OF THE DRAWINGS

FIG. 7 shows an example of the structure of PAN information in the present invention;

FIG. 8 shows an example of the structure of packet transfer rules according to the present invention;

FIG. 13 shows an example of a session information message that is transmitted to the PAN registration device;

DETAILED DESCRIPTION OF THE PREFERRED EMBODIMENTS

As embodiments of the packet distribution system according to the present invention, the following explanation regards examples of a packet distribution system for transferring packet data, which are streaming data, from mobile network 200, which is made up from, for example, a 3G cellular packet communication network or Hot Spots, to communication terminals 1 on personal area network (PAN) 100 that is connected by way of a plurality of communication links to mobile network 200.

First Embodiment

The following explanation regards the first embodiment of the packet distribution system according to the present invention with reference to FIGS. 3 to 16.

Configuration

Figure 1:
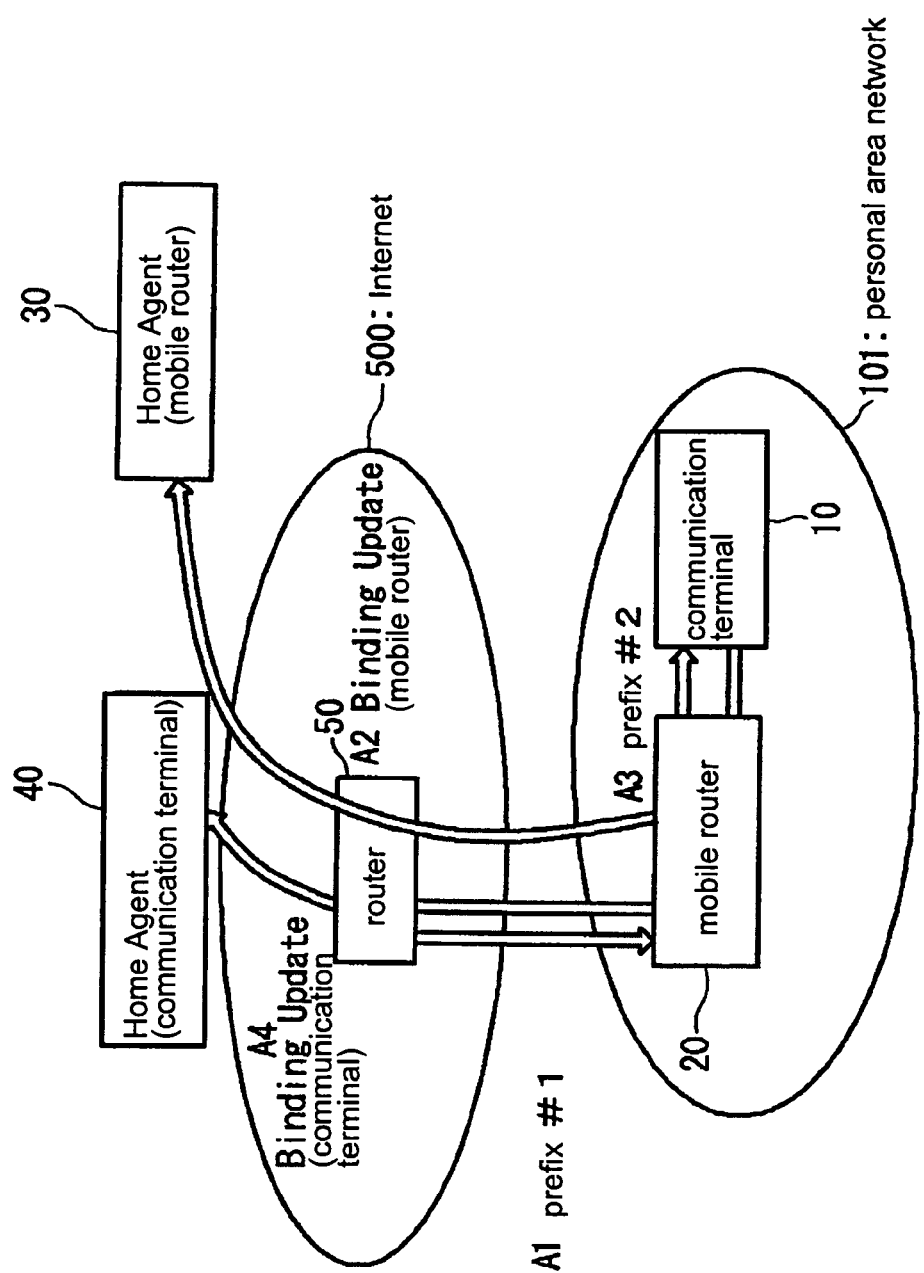
FIG. 1 is a block diagram of a NEMO of the prior art.
Figure 2:
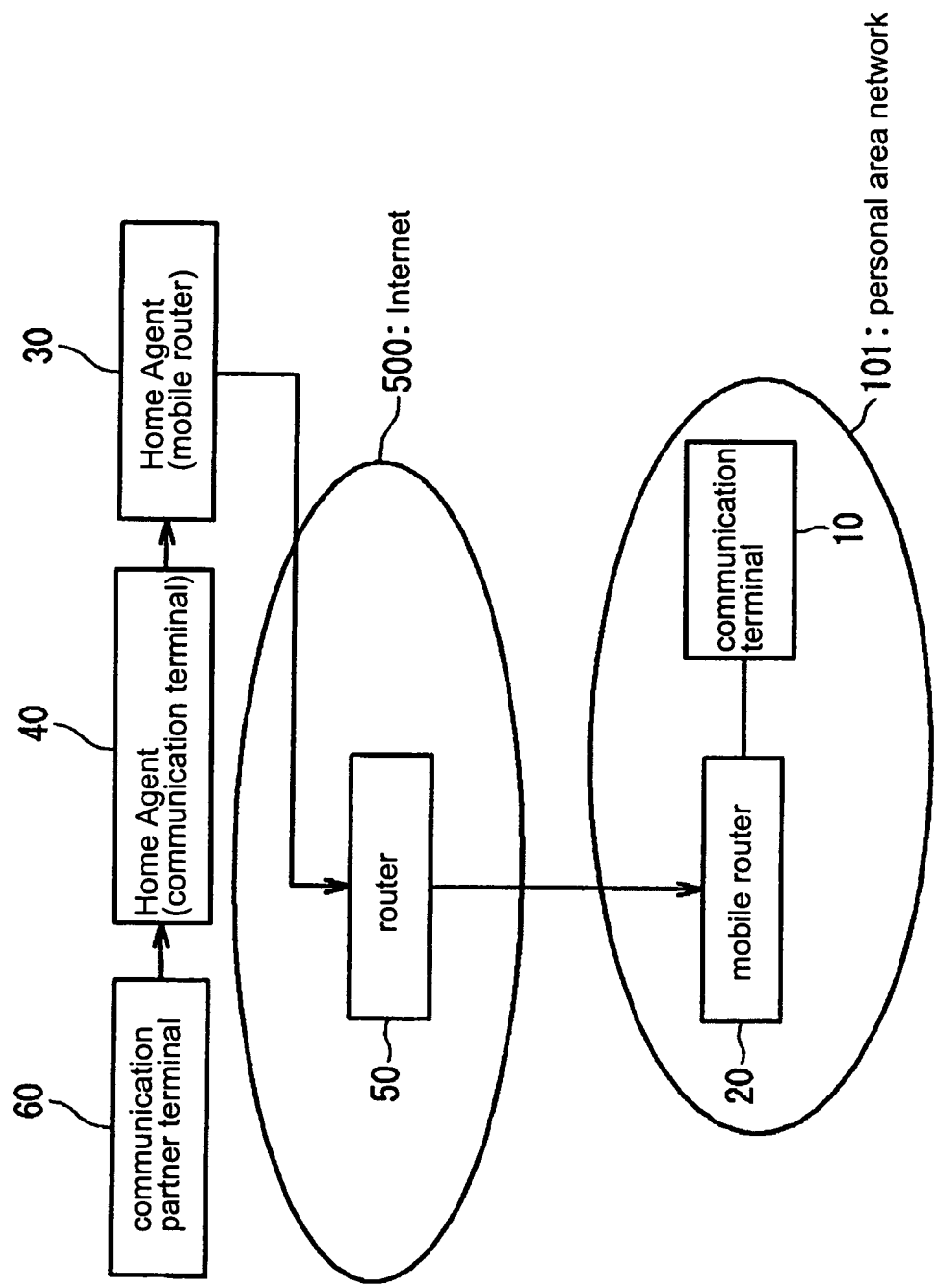
FIG. 2 is a block diagram showing the flow of packet transfer of a NEMO of the prior art.
Figure 3:
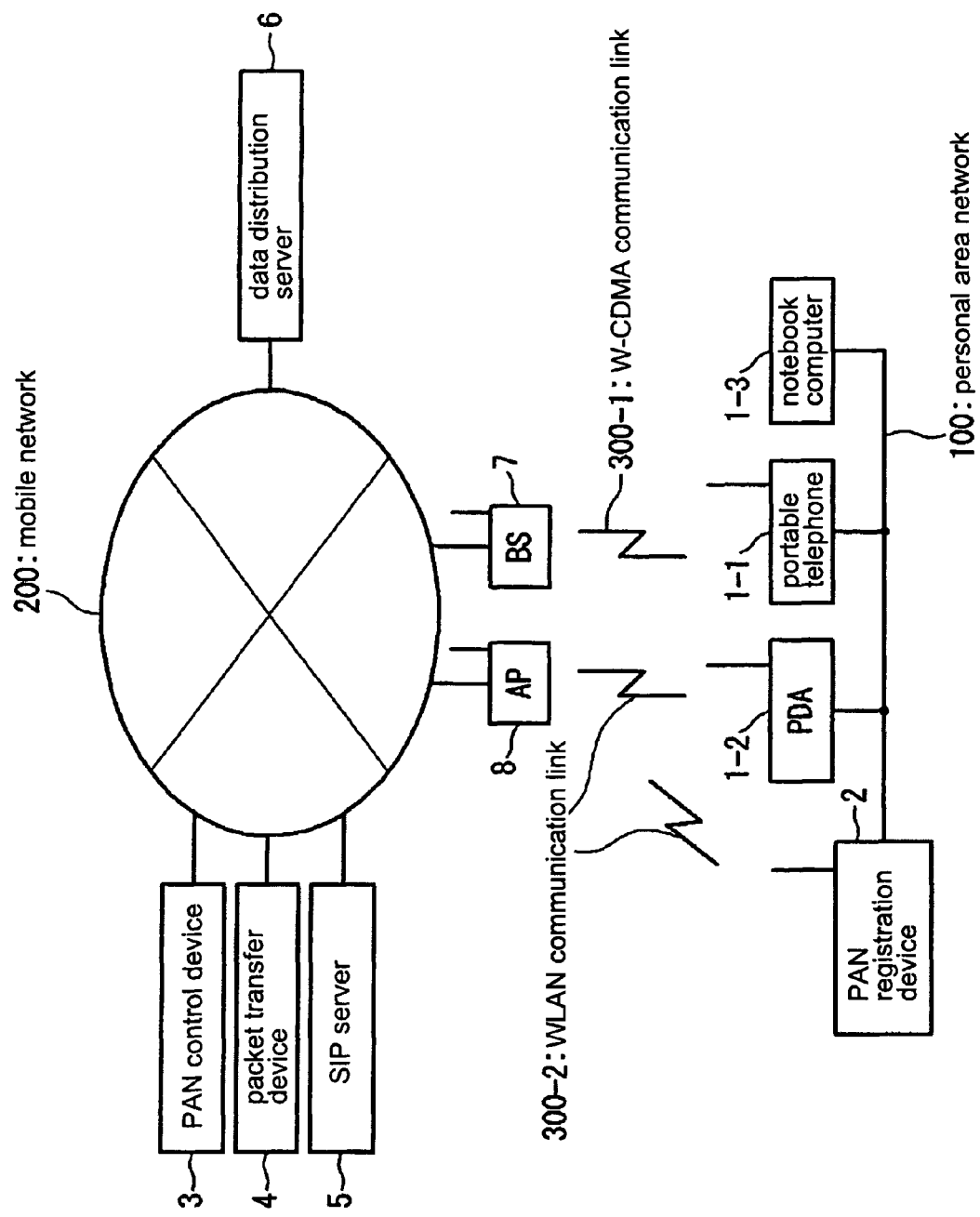
FIG. 3 shows the configuration in the first embodiment of the packet distribution system according to the present invention.

The configuration of the packet distribution system of the first embodiment is described with reference to FIG. 3. The packet distribution system according to the present invention is provided with: personal area network (PAN) 100; and mobile network 200 that is connected by way of a plurality of communication links to PAN 100. Mobile network 200 is provided with: PAN control device 3, packet transfer device 4, and SIP (Session Initiation Protocol) server 5. In addition, the mobile network 200 is further provided with: data distribution server 6 for distributing streaming data; radio base station (BS) 7 that is connected to 3G cellular communication network and that constitutes W-CDMA communication link 300-1 with PAN 100; and access point (AP) 8 that is connected to a Hot Spot and that constitutes WLAN communication link 300-2 with PAN 100. PAN 100 is a private network between terminals that have undergone authentication in which a plurality of communication terminals 1 and PAN registration device 2 are connected together by short-range communication circuits such as USB or Bluetooth. As the plurality of communication terminals 1, PAN 100 is provided with portable telephone 1-1, PDA 1-2, and notebook computer 1-3, portable telephone 1-1 being connected to mobile network 200 by way of W-CDMA link 300-1 and PDA 1-2 being connected to mobile network 200 by way of WLAN communication link 300-2. In addition, the PAN registration device 2 is connected to mobile network 200 by way of WLAN communication links 300-2.

Communication terminals 1 are communication terminals represented by, for example, portable telephone 1-1, PDA 1-2, and notebook computer 1-3; hold communication link identification addresses 94 and terminal identification addresses 93 that are acquired from PAN registration device 2; and register in PAN registration device 2. In addition, communication terminals 1 have connection interfaces with other communication terminals 1 (interfaces for PAN) and connection interfaces with mobile network 200. Communication terminals 1 need not have connection interfaces with mobile network 200 if they are able to connect by way of the PAN to another communication terminal having a connection interface with mobile network 200, as in the case of, for example, notebook computer 1-3 that is shown in FIG. 3.

Figure 4:
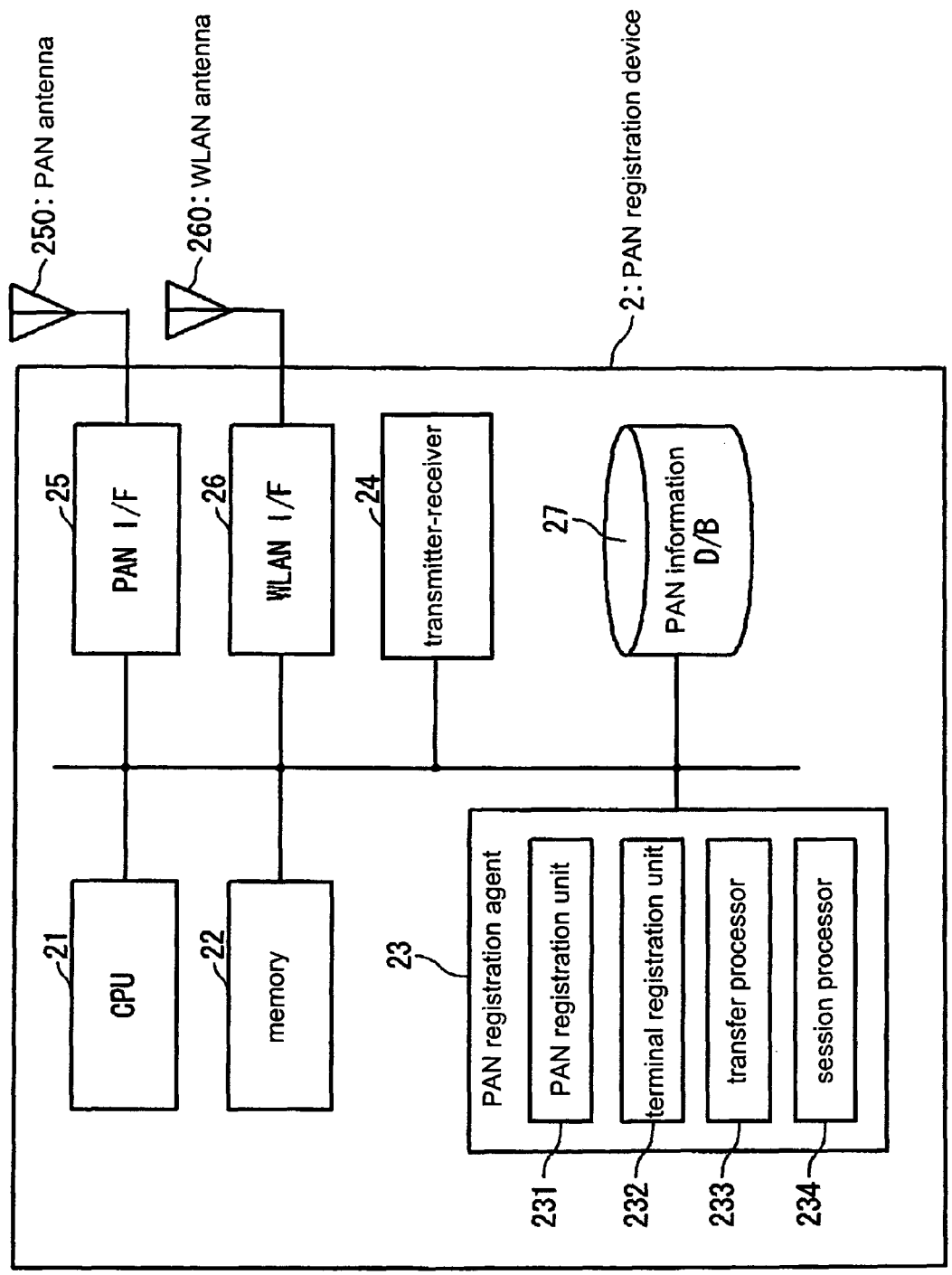
FIG. 4 shows the configuration in an embodiment of a PAN registration device according to the present invention.

FIG. 4 shows the configuration of PAN registration device 2 according to the present invention. PAN registration device 2 according to the present invention is provided with: CPU 21, memory 22, PAN registration agent 23 that is stored in a memory device such as memory, transmitter-receiver 24, personal area network interface (PAN I/F) 25, radio LAN interface (WLAN I/F) 26, and PAN information D/B 27 that is stored in a memory device such as a hard disk or memory; these components being connected together by a communication bus. In addition, PAN I/F 25 is connected to PAN antenna 250, and PAN registration device 2 is connected to communication terminals 1 on PAN 100 by way of PAN antenna 250. WLAN I/F 26 is connected to WLAN antenna 260 and thus connected to mobile network 200.

CPU 21 executes processing in PAN registration agent 23. CPU 21 further carries out processing of various types of data and signals in PAN registration device 2. Memory 22 temporarily stores data during the execution of various processes in CPU 21. PAN registration agent 23 is provided with: PAN registration unit 231, terminal registration unit 232, transfer processor 233, and session processor 234. PAN registration unit 231 issues a PAN registration request to PAN control device 3 on mobile network 200 when a PAN is newly created or newly connected to mobile network 200, acquires PAN identification address 91 that is assigned to that PAN, and stores PAN identifier 92 and PAN identification address 91 that identify PAN 100 in association with each other in PAN information D/B 27. Terminal registration unit 232 assigns terminal identification addresses 93 in accordance with PAN subscription requests from communication terminals 1 that are connected to PAN 100, stores terminal identification addresses 93 that are received from communication terminals 1 in PAN information D/B 27, and implements PAN subscription registration of communication terminals 1. At such times, when communication terminals 1 can be connected to mobile network 200, terminal registration unit 232 similarly receives from communication terminals 1 addresses (communication link identification addresses 94) that are assigned to the connection interfaces with mobile network 200 and the communication link type, and stores this information in PAN information D/B 27 in correspondence with terminal identification addresses 93. Transfer processor 233 issues packet transfer requests to PAN control device 3 for placing in correspondence: terminal identification addresses 93, communication link addresses, and communication link types. Session processor 234 issues session establishment requests and session cutoff requests to SIP server 5 and executes processing for establishing and cutting off sessions with servers such as data distribution server 6 that are connected to mobile network 200. At such times, PAN registration device 2 is in a state for registering the correlation of service identifiers such as SIP-URI and the IP addresses of the PAN registration device.

Transmitter-receiver 24 is connected to PAN I/F 25 and WLAN I/F 26 and executes processing for the transmission/reception of data or signals between mobile network 200 and communication terminals 1 by way of either of these interfaces. PAN I/F 25 in the present embodiment is a Bluetooth interface and alters the format of data or signals that are received from communication terminals 1 by way of transmitter-receiver 24 or PAN antenna 250. A PAN may also be formed by using, for example, a USB interface in PAN I/F 25 to connect with communication terminals 1 by way of a cable line. WLAN I/F 26 is a radio LAN interface and alters the format of data or signals that are received from transmitter-receiver 24 or mobile network 200.

PAN information D/B 27 stores PAN information that is registered by PAN registration agent 23. Referring to FIG. 7, in PAN information, PAN identifier 92 and PAN identification address 91 that are received from mobile network 200 are placed in correspondence. Terminal identification addresses 93 that have been assigned to communication terminals 1 on PAN 100 are also placed in correspondence with communication link identification addresses 94 and communication link types that are received from communication terminals 1. PAN identification addresses 91, terminal identification addresses 93, and communication link identification addresses 94 are IP addresses. In addition, terminal identification addresses 93 may be private IP addresses that can be used only in PAN 100. PAN identification addresses 91 are addresses for transmitting packets addressed to a PAN to packet transfer device 4. FIG. 7 (a) shows PAN identification information of PAN 100 that is connected to, for example, portable telephone 1-1, PDA 1-2, notebook computer 1-3, . . . PAN identifier 92 of PAN 100 is PAN A, and PAN identification address 91 is IP_PAN#A. Terminal identification addresses 93 of portable telephone 1-1, PDA 1-2, and notebook computer 1-3 are IPha#111, IPha#112, and IPha#113, respectively. In addition, the connectable communication link types are W-CDMA for portable telephone 1-1, WLAN for PDA 1-2; and communication link identification addresses 94 corresponding to these communication terminals are IPra#111 and IPra#112, respectively. Communication link identification address 94 and the communication link type for notebook computer 1-3 that lacks means for connecting to mobile network 200 are both "Null." FIG. 7 (b) shows the PAN information of PAN 100 (PAN B) to which are connected communication terminals 1 that are able to connect to mobile network 200 by a plurality of communication links. For example, when communication terminal 1 to which IPha#114 has been assigned as terminal identification address 93 is able to connect to mobile network 200 by the two types of communication means W-CDMA and WLAN, the communication link types are W-CDMA and WLAN, and IPra#114 and IPra#115, respectively, are placed in correspondence with each other as communication link identification addresses 94. In FIG. 7 (c), the terminal identification address 93 that is assigned to communication terminal 1 on PAN 100 may be a Home Address (for example HoA#x), and communication link identification address 94 may be a Care-of Address (for example, CoA#x).

Figure 5:
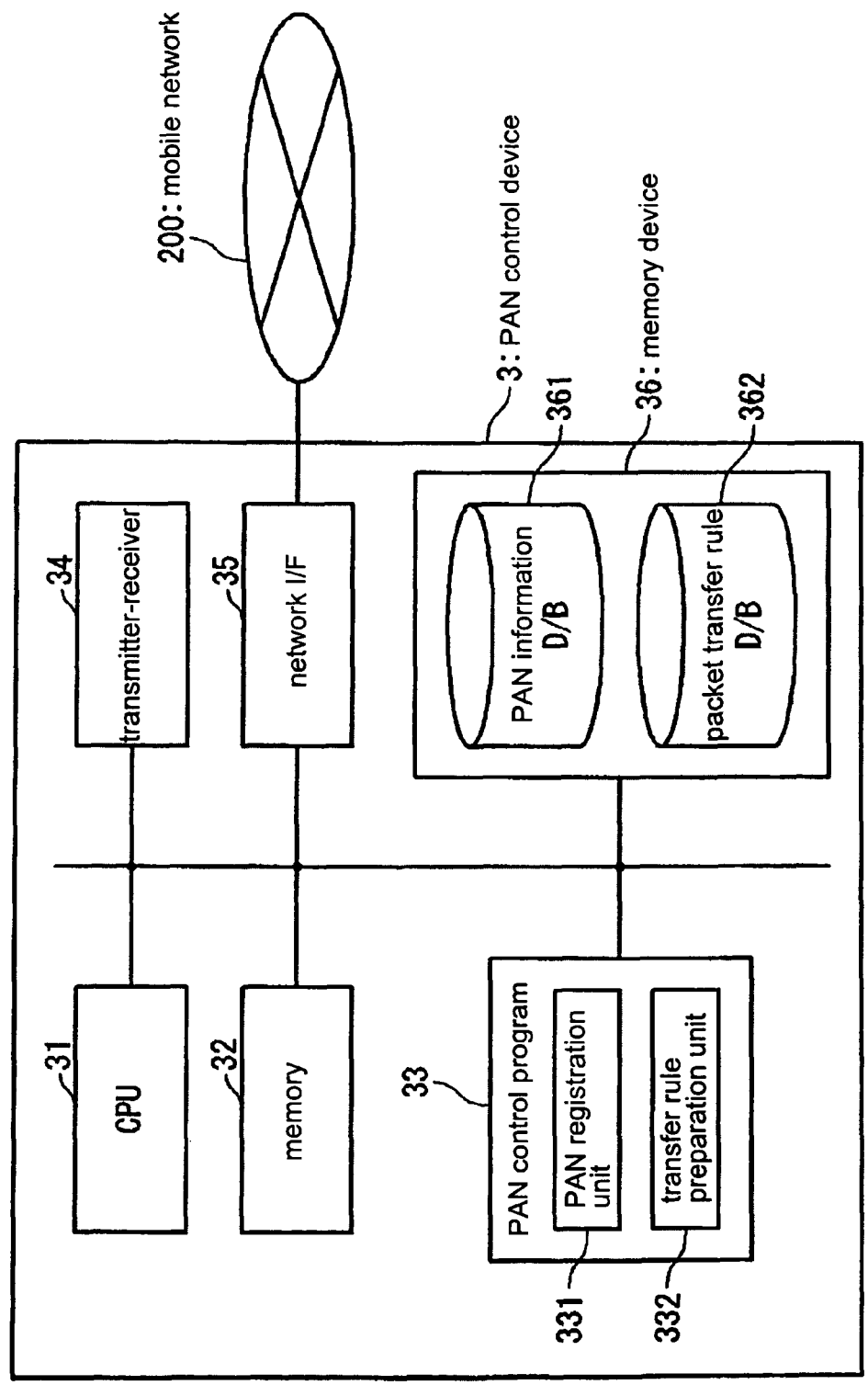
FIG. 5 shows the configuration in an embodiment of a PAN control device according to the present invention.

PAN control device 3 according to the present invention registers and controls the PANs that connect to mobile network 200 and prepares packet transfer rules 90. Referring to FIG. 5, the configuration of PAN control device 3 is made up by: CPU 31, memory 32, PAN control program 33 that is stored in a memory device such as memory or a hard disk, transmitter-receiver 34, network interface (network I/F) 35, and memory device 36; these components being connected together by a communication bus. Memory device 36 is provided with: PAN information database (PAN information D/B) 361 for storing PAN identifiers 92 and PAN identification addresses 91, and packet transfer rule 90 database (packet transfer D/B) 362 for storing packet transfer rules 90.

CPU 31 executes the processing in PAN control program 33. CPU 31 also carries out processing of the various types of data and signals in PAN control device 3. Memory 32 temporarily stores data during the execution of the various processing in CPU 31. PAN control program 33 is provided with PAN registration unit 331 and transfer rule preparation unit 332. PAN registration unit 331 extracts PAN identifiers 92 and PAN identification addresses 91 from PAN information D/B 361 in accordance with a PAN registration requests from PAN registration device 2 on PAN 100, transmits to PAN registration device 2 and assigns PAN identification addresses 91 and PAN identifiers 92. PAN registration unit 331 further stores PAN identifiers 92 and PAN identification addresses 91 that are received from PAN registration device 2 in PAN information D/B 361 and performs registration. Packet transfer rules preparation unit 332 prepares packet transfer rules 90 in accordance with a packet transfer requests from PAN registration device 2 and both stores packet transfer rules 90 in packet transfer rule D/B 362 and transmits packet transfer rules 90 to packet transfer device 4. Transmitter-receiver 34 executes processing for transmitting and receiving data and signals between each device that is connected to mobile network 200 by way of network I/F 35.

Packet transfer device 4 according to the present invention is a device that is connected to mobile network 200 and that transfers packet data that are transmitted from data distribution server 6 that distributes packet data to communication terminal 1 on PAN 100 by way of communication links that accord with the media of these packet data.

Figure 6:
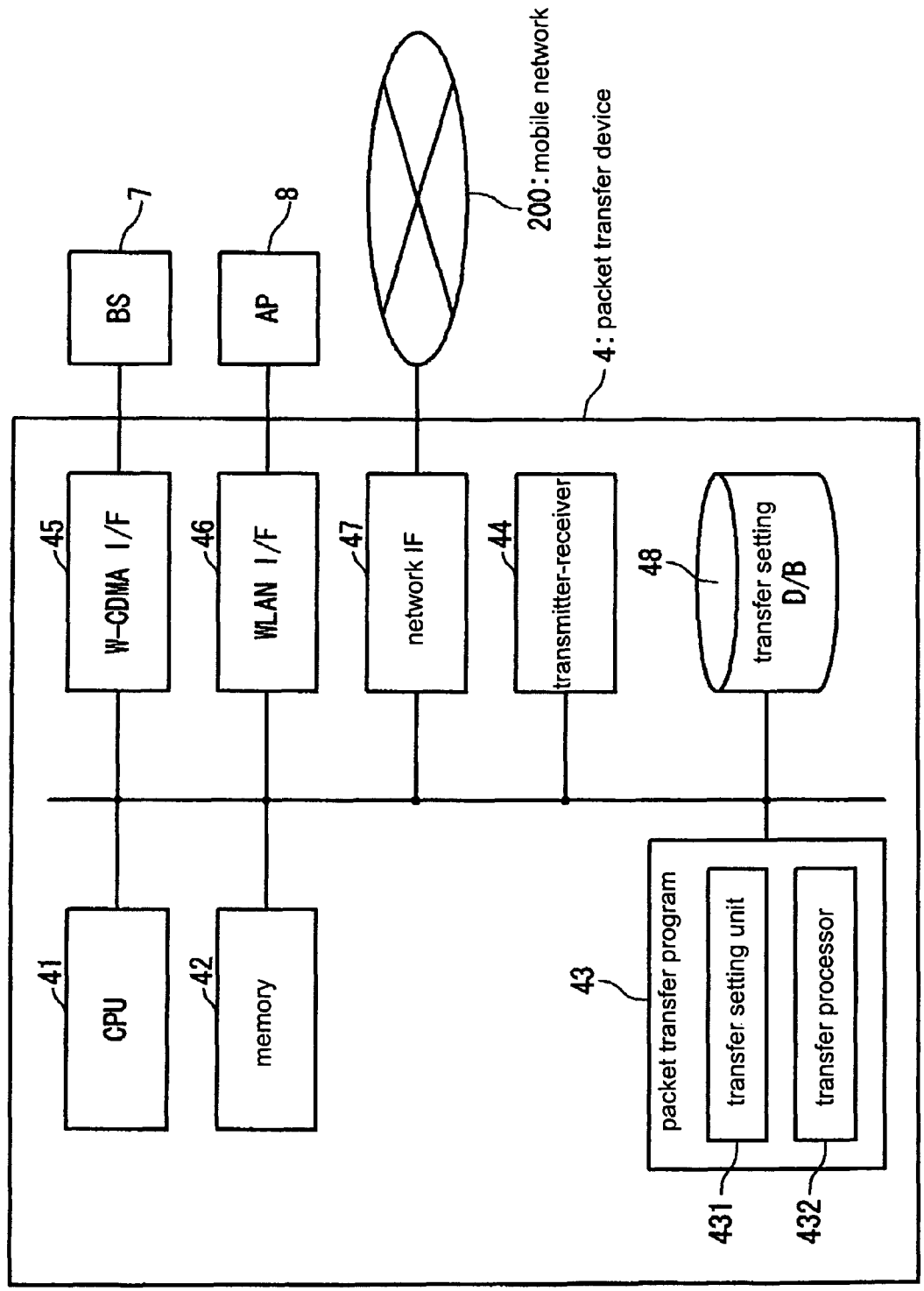
FIG. 6 shows the configuration in an embodiment of a packet transfer device according to the present invention.

Referring to FIG. 6, the configuration of packet transfer device 4 includes: CPU 41, memory 42, packet transfer program 43 that is stored in a memory device such as memory or a hard disk, transmitter-receiver 44, W-CDMA interface (W-CDMA I/F) 45, WLAN interface (WLAN I/F) 46, network interface (network I/F) 47, and transfer setting database (transfer setting D/B) 48 that is stored in a memory device such as memory or a hard disk; these components each being connected together by a communication bus.

CPU 41 executes processing in packet transfer program 43. CPU 41 further carries out the processing of various types of data and signals in packet transfer device 4. Packet transfer program 43 is provided with transfer setting unit 431 and transfer processor 432. Transfer setting unit 431 stores packet transfer rules 90, which are received in accordance with a packet transfer setting request from PAN control device 3, in transfer setting D/B 48 as transfer settings. Based on the transfer settings in transfer setting D/B 48, transfer processor 432 encapsulates the packet data that are received from data distribution server 6 with communication link identification addresses 94 and transfers to communication terminals 1 on PAN 100. Transmitter-receiver 44 processes the transmission and reception of data and signals to devices that are outside packet transfer device 4. Transmitter-receiver 44 further selects an interface for packet data that have been encapsulated by transfer processor 432 based on the destination address (DA) of these data and transfers the packets to communication terminals 1 on PAN 100. W-CDMA I/F 45 is connected to BS 7 by way of, for example, a 3G cellular network and alters the format of data and signals to implement transmission and reception with communication terminals 1 (for example, portable telephone 1-1). WLAN I/F 46 is connected to AP 8 by way of, for example, a Hot Spot, and alters the format of data and signals to implement transmission and reception with communication terminals 1 (for example, PDA 1-2).

Referring to FIG. 8, the configuration of packet transfer rules 90 is shown. Packet transfer rules 90 are composed by placing in correspondence: destination PAN identification addresses, the IP addresses of transmission sources, the port numbers of transmission sources, and flow information. The flow information includes: distribution destination terminal identification addresses, which are terminal identification addresses 93 of the distribution destinations of packet data; communication link identification addresses 94 of communication terminals 1 that are the transfer destinations to which packet transfer device 4 transfers packets; the port numbers; and media information 95 that are used for determining the communication links that are used for transfer. Media information 95 includes: the media types of packet data (for example, speech data and moving picture data), port numbers, transport protocol, and media format lists.

SIP server 5 is, for example, a server for controlling an End-to-End session, and uses protocol such as Session Initiation Protocol (SIP) to implement session control such as the establishment or disconnection of a session. In SIP server 5, the IP addresses of the PAN registration device 2 and data distribution server 6 are registered in the addresses that correspond to SIP-URI, which are the session identifiers.

Data distribution server 6 is a server that uses, for example, RTP (Real-Time Transport Protocol) to perform streaming distribution.

Operation

The following explanation regards the operation in the first embodiment of the packet distribution system according to the present invention with reference to FIGS. 9 to 16. In the present embodiment, the operation of the packet distribution system according to the present invention is explained by way of an example in which moving picture data and speech data are distributed from data distribution server 6 to notebook computer 1-3 on PAN 100 by way of a plurality of communication links 300. The present explanation is divided between the four operations of: registration of a PAN; subscription of a terminal to a PAN, initiation of communication, and packet transfer.

PAN Registration Process

Figure 9:
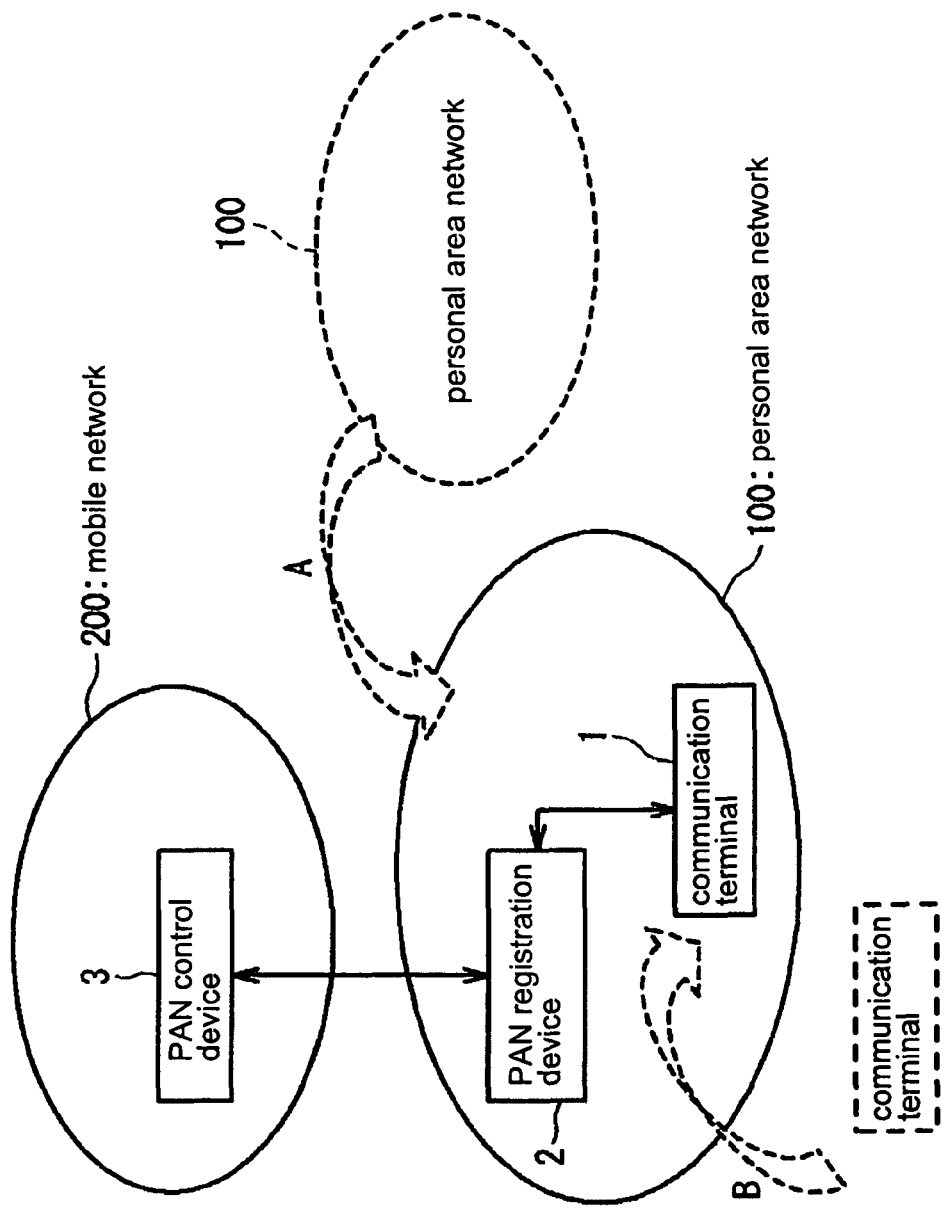
FIG. 9 is a block diagram of the PAN registration process and the subscription process of a communication terminal to a PAN in an embodiment of a packet distribution system according to the present invention.
Figure 10:
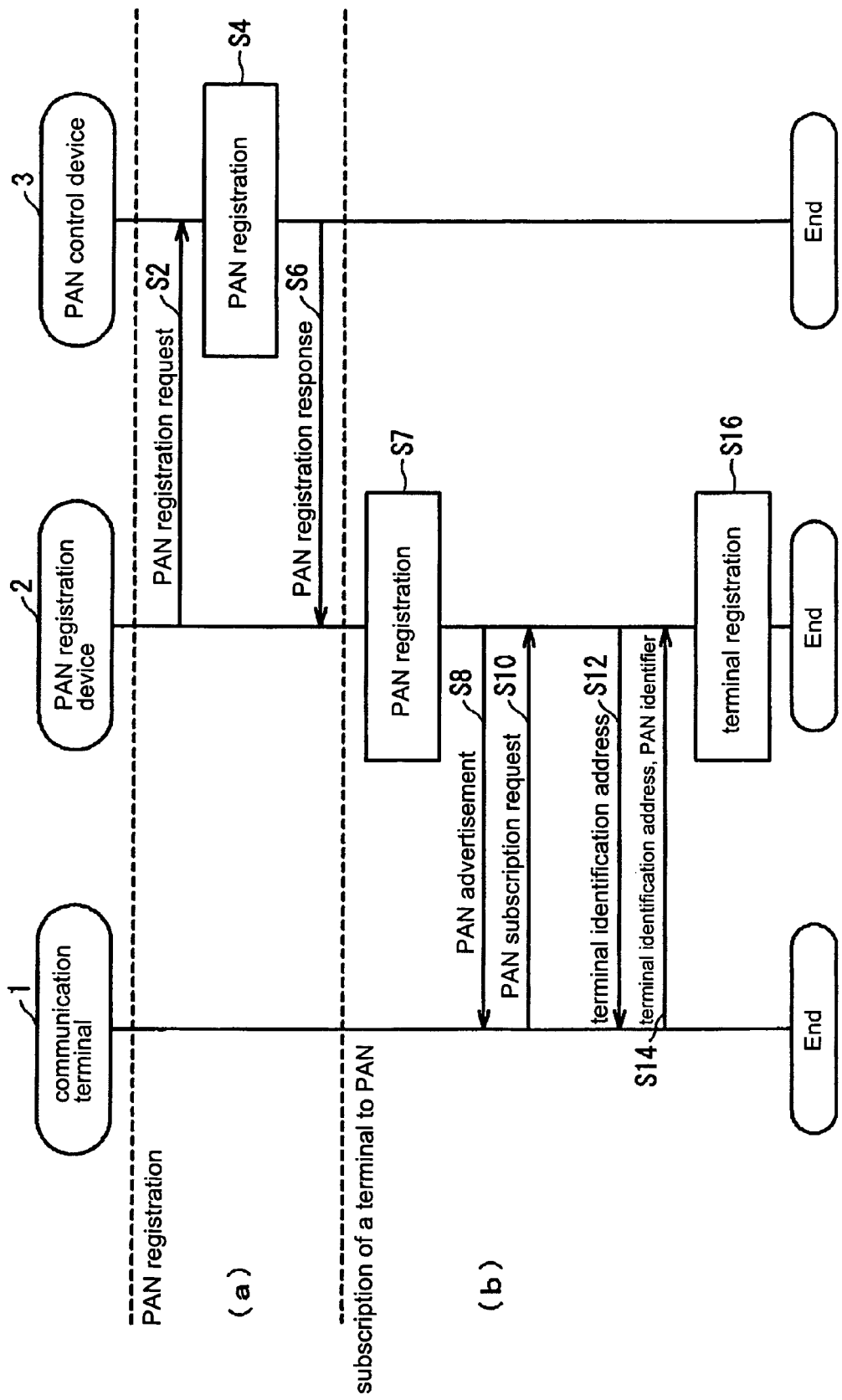
FIG. 10 is a sequence diagram of the PAN registration process and the subscription process of a communication terminal to a PAN in an embodiment of a packet distribution system according to the present invention.

The following explanation regards the PAN registration process of the packet distribution system according to the present invention with reference to FIGS. 9 and 10.

Referring to FIG. 9, a block diagram is shown of the PAN registration process. When PAN registration device 2 newly forms PAN 100 as shown by dotted lines A in FIG. 9, or when PAN registration device 2 receives a mobile network advertisement from mobile network 200 due to the movement of PAN 100, PAN registration is executed in PAN control device 3.

The operation of the PAN registration process is described with reference to FIG. 10 (a). When PAN 100 is newly formed, PAN registration unit 231 of PAN registration device 2 connects by way of WLAN communication link 300-2 to PAN control device 3 on mobile network 200 and both transmits the IP address of PAN registration device 2 to PAN control device 3 and issues a PAN registration request to PAN control device 3 (Step S2). PAN registration unit 331 of PAN control device 3, having received the PAN registration request, assigns to newly registered PAN 100 PAN identifier 92 and PAN identification address 91 that are in PAN information D/B 361, and having placed PAN identifier 92 and PAN identification address 91 in correspondence with PAN 100, realizes registration (Step S4). PAN registration unit 331 next extracts this PAN identifier 92 and PAN identification address 91 from PAN information D/B 361, transmits them addressed to the IP address of PAN registration device 2, and further, issues a PAN registration response (Step S6). PAN registration unit 231 of PAN registration device 2, upon receiving the PAN registration response, stores PAN identifier 92 and PAN identification address 91 that are received in PAN information D/B 27 to complete registration (Step S7).

Process for Subscription of a Terminal to PAN 100

The following explanation regards the operation of the subscription process of a terminal to PAN 100 of the packet distribution system according to the present invention with reference to FIGS. 9 and 10.

Referring to FIG. 9, a block diagram is shown of the subscription process of a communication terminal to PAN 100. As shown by dotted lines B in FIG. 9, PAN registration device 2 subscribes and registers communication terminal 1 when communication terminal 1 makes a new connection to PAN 100.

The operations for the process of subscription of a terminal to PAN 100 are explained with reference to FIG. 10 (*b*). Terminal registration unit 232 of PAN registration device 2 transmits a PAN advertisement to which PAN identifier 92 has been added to PAN 100 (Step S8). Communication terminal 1 that is newly connected to PAN 100 by entering within the area of PAN or by switching ON its power supply receives the PAN advertisement. Communication terminal 1 that has received the PAN advertisement issues a PAN subscription request to PAN registration device 2 to subscribe to PAN 1 (Step S10). Terminal registration unit 232 of PAN registration device 2, upon receiving the PAN subscription request, assigns terminal identification address 93 from within PAN information D/B 27 and transmits terminal identification address 93 together with PAN identifier 92 to communication terminal 1 (Step S12). Communication terminal 1 records terminal identification address 93 and PAN identifier 92 that are received from PAN registration device 2, and transmits this terminal identification address 93 and PAN identifier 92 to PAN registration device 2 and thus registers (Step S14). At this time, if communication terminal 1 is able to connect with mobile network 200, communication terminal 1 similarly transmits to PAN registration device 2 the communication link type and communication link identification address 94, which is the address that is assigned to the connection interface with mobile network 200. Terminal registration unit 232 of PAN registration device 2 verifies the PAN identifier that is received from communication terminal 1, and if this identifier matches its own PAN identifier, stores this terminal identification address 93, communication link identification address 94, and communication link type in association with each other as PAN information in PAN information D/B 27 (Step S16).

As described above, PAN registration device 2 implements PAN registration in PAN control device 3 on mobile network 200, and subscribes and registers communication terminal 1 that is connected to PAN 100. In this way, PAN registration agent 23 prepares the PAN information such as is shown in FIG. 7(*a*). Further, the correspondences between communication terminal 1, terminal identification address 93, communication link identification address 94, and the usable communication link type are: "IPha#111, IPra#111, W-CDMA" for portable telephone 1-1; "IPha#12, IPra#112, WLAN" for PDA 1-2; and IPha#112, none, no usable communication link" for notebook computer 1-3.

Initiation of Communication

Figure 11:
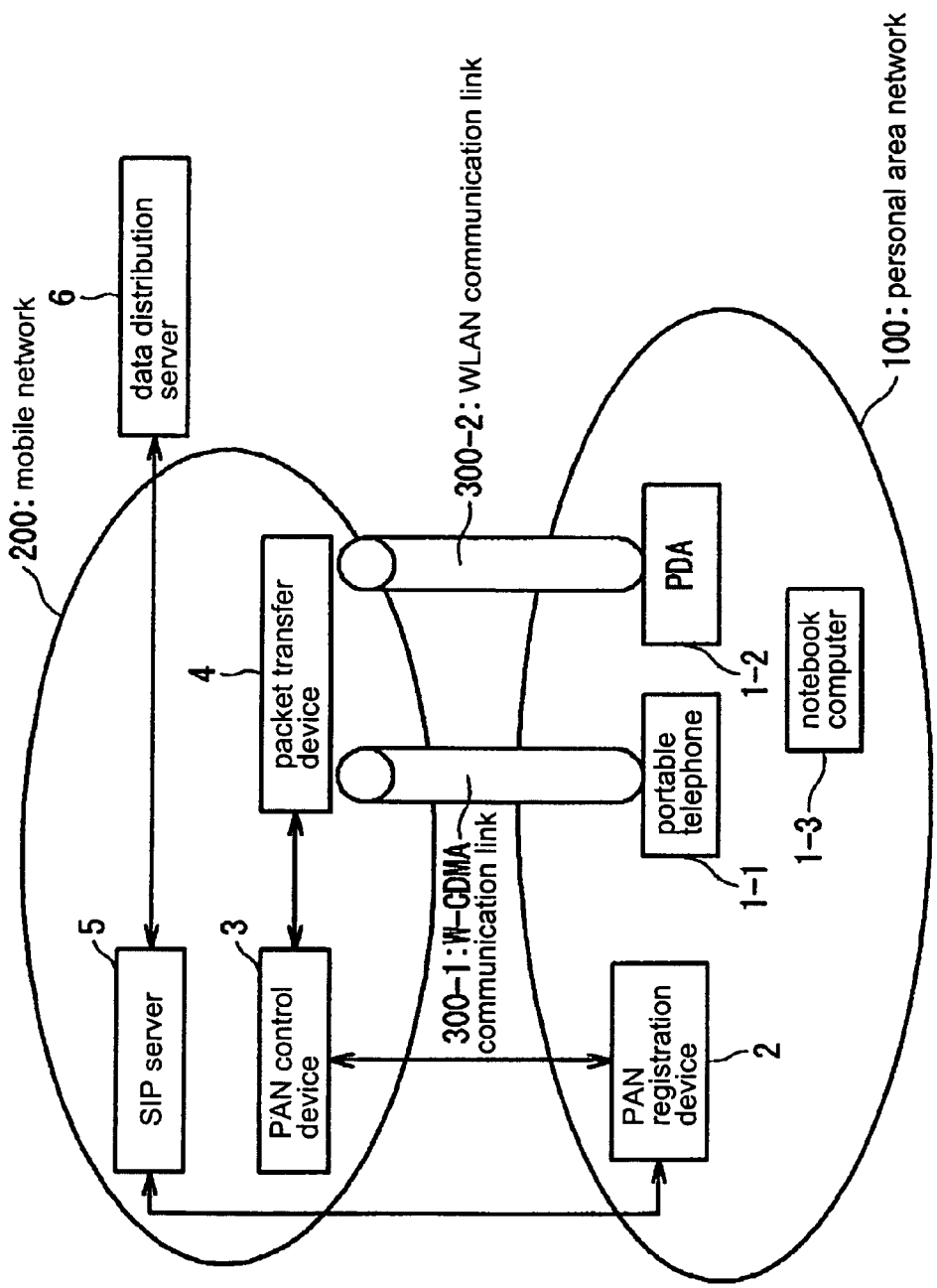
FIG. 11 is a block diagram of the communication initiation process in the first embodiment of the packet distribution system according to the present invention.
Figure 12A:
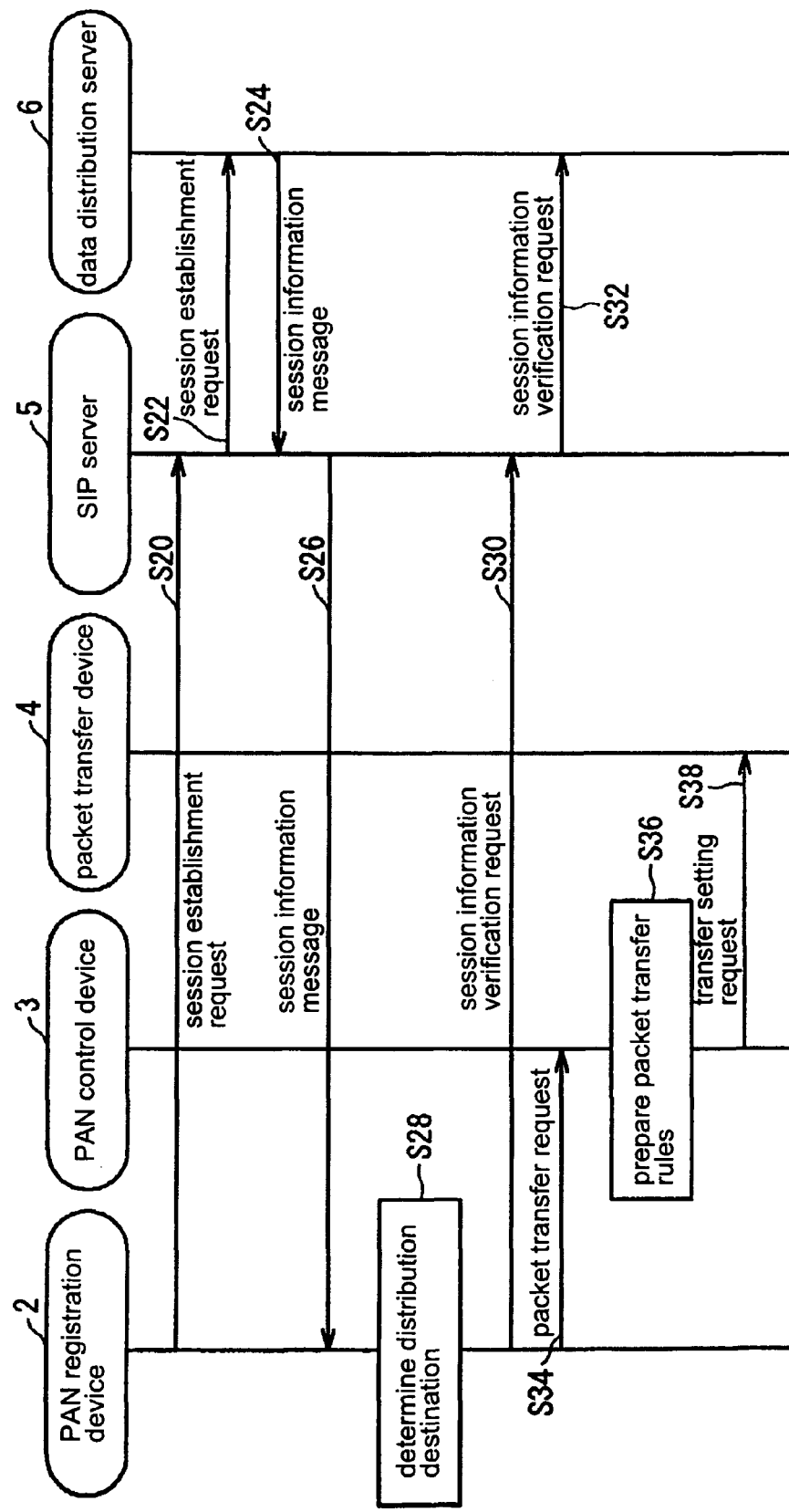
FIG. 12A is a sequence diagram of the communication initiation process in the first embodiment of a packet distribution system according to the present invention.
Figure 12B:
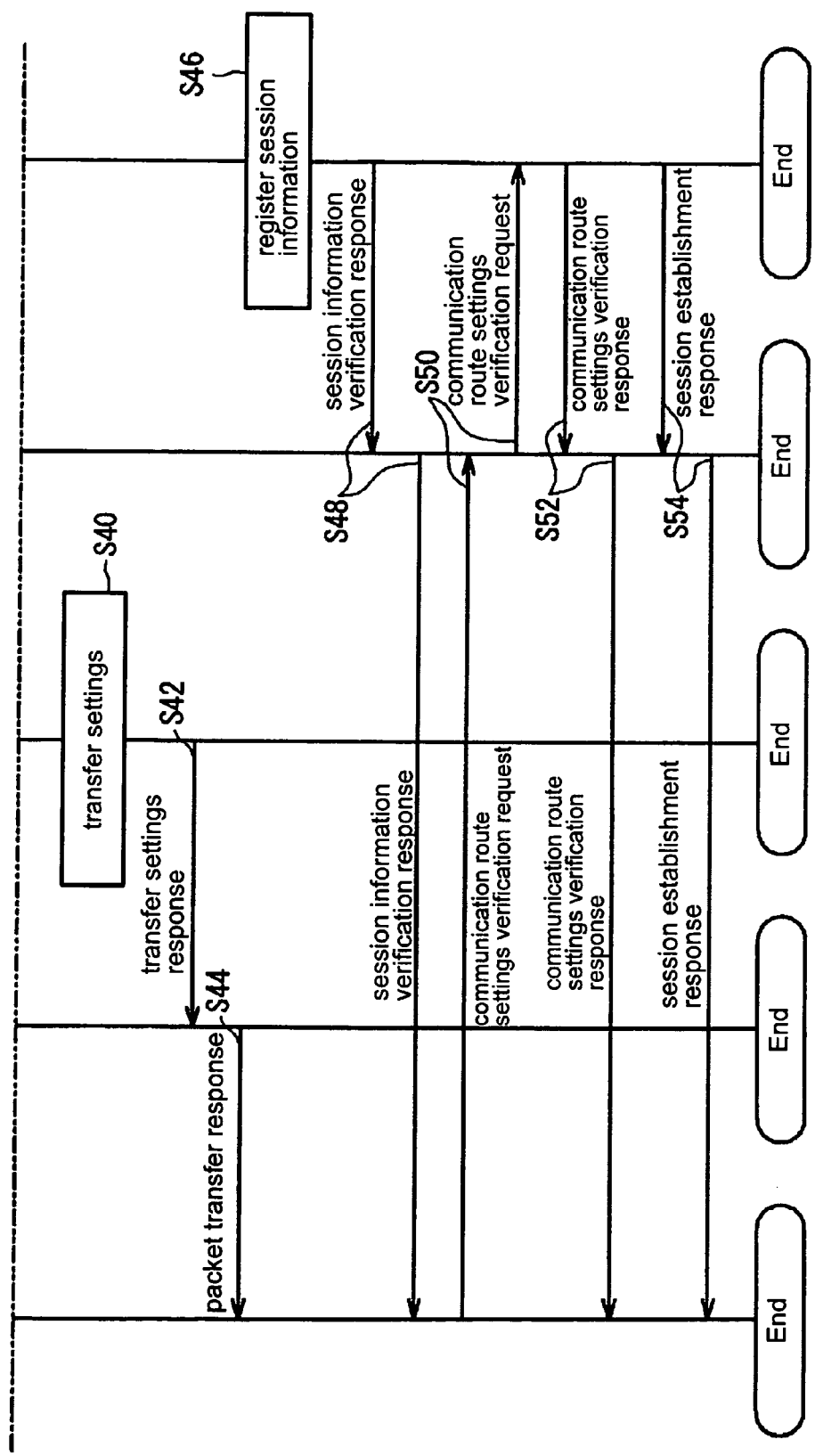
FIG. 12B is a sequence diagram of the communication initiation process in the first embodiment of the packet distribution system according to the present invention.

The following explanation regards the operations of the communication initiation process (the session establishment process and the packet transfer settings preparation process) of the packet distribution system according to the present invention with reference to FIGS. 11, 12A and 12B. FIG. 11 shows a block diagram of the process for establishing a session between data distribution server 6 and PAN 100 and the process for preparing the packet transfer settings in mobile network 200. FIGS. 12A and 12B are sequence diagrams of the session establishment process and the packet transfer settings preparation process.

In order for notebook computer 1-3 to receive streaming data that are composed of moving picture data and speech data from data distribution server 6, session processor 234 of PAN registration device 2 designates PAN identification address 91 as the IP address of the distribution destination of the streaming data, and further, designates receivable media information 95 and port number, and transmits a session establishment request to SIP server 5. Here, for example, "IP_#A" is designated as PAN identification address 91 that is to transmit, "moving picture data and speech data" is designated as receivable media information 95, "port number (3456) of portable telephone 1-1 and port number (2232) of PDA 1-2" are designated as the port numbers, and a service identifier is included in the session establishment request (Step S20). SIP server 5, upon receiving the session establishment request, transfers this session establishment request to data distribution server 6 in accordance with the IP address that corresponds to the service identifier that is included in the session establishment request (Step S22).

Data distribution server 6, upon receiving the session establishment request, transmits to SIP server 5 a session information message that includes session information that notes media information 95 and port number to which the data distribution server 6 corresponds and the IP address of data distribution server 6 that is the distribution source of the streaming data, and the added service identifier (Step S24). These messages for establishing a session include session information that is recorded by means of SDP (Session Description Protocol). The session information message that is transmitted is, for example, "moving picture data and speech data" as media information 95 to which data distribution server 6 corresponds, "3456 and 2234" as the corresponding port numbers, and the IP address "IPda#150" of data distribution server 6 that is the distribution source of the streaming data. FIG. 13 shows an example of a session information message that is transmitted from data distribution server 6 to PAN registration device 2. The media type, port number, transport protocol, and media format list are recorded in the session information. The description "M=audio 3456 RTP/AVP 0" and "M=Video 2232 RTP/AVP 31" indicates media information 95, the media type, port number, transport protocol, and media format list being noted in order from the left. "M=audio 3456 RTP/AVP 0" indicates the use of 3456 as the port number, the use of RTP (Real-time Transport Protocol) and AVP as the transport protocol, and the use of speech data that have been converted by PCM (Pulse Code Modulation). "M=Video 2232 RTP/AVP 31" indicates the use of 2232 as the port number, the use of RTP and AVP as transport protocol, and the transmission of image data that have been encoded by H.261 The transport protocol and encoding method are not limited to these examples. SIP server 5, in accordance with the IP address that corresponds to the service identifier, transmits the session information message that has been received to PAN registration device 2 (Step S26). Session processor 234 of PAN registration device 2, upon receiving the session information message, determines media information 95 that is to be used in the distribution of streamlining data, the port number that is the distribution destination, and the IP address (Step S28), and issues a session information verification request to data distribution server 6 by way of SIP server 5 (Steps S30 and S32).

Packet transfer processor 233 of PAN registration device 2 both transmits a session information verification message and issues a packet transfer request to PAN control device 3 (Step S34). The packet transfer request includes flow information that records, for each flow that is included in the session, flow information that notes the IP addresses and port numbers of the terminals that perform communication at the source and destination, to which the used communication link identification addresses 94, transport protocol, and media format list are placed in correspondence and added. Transfer rule preparation unit 332 of PAN control device 3, upon receiving the packet transfer request, prepares from information that is included in the packet transfer request packet transfer rules 90 that place in correspondence for each flow: PAN identification address 91, which is the destination address of the streaming distribution; the IP address and port number of data distribution server 6, which is the distribution source of the packet data; terminal identification address 93 of the distribution destination of the packet data; communication link identification address 94 and the port number that are used in the packet transmission; and media information 95 that includes the transport protocol and media format list (Step S36). Referring to FIG. 8, packet transfer rules 90 place in correspondence, for example, "IP_PAN#A" as the destination PAN identification address, "IPda#150" as the distribution source IP address, "1234" as the port number of the distribution source, "IPha#113" of notebook computer 1-3 as the distribution destination terminal identification address; and further includes: "IPra#111, 3456" of portable telephone 1-1 and "IPra#112" of PDA 1-2 as communication link identification addresses 94 and port numbers that are used in the packet transmission; these being placed in correspondence with payload types "0" and "31," respectively, as corresponding media information 95. Transfer rule preparation unit 332 issues a packet transfer setting request that includes the transfer rules that have been prepared to packet transfer device 4 (Step S38). Transfer setting unit 431 of packet transfer device 4 stores in transfer settings D/B 48 packet transfer rules 90 that are included in the packet setting request that is received from PAN control device 3 and registers these as the transfer settings (Step S40). Upon completing the transfer settings, transfer setting unit 431 issues a transfer settings response to PAN control device 3 (Step S42). Transfer rule preparation unit 332 of PAN control device 3, upon receiving the transfer settings response, issues a packet transfer response to PAN registration device 2 (Step S44).

Data distribution server 6, upon receiving the session information verification request in Step S32, registers the session information that is included in the session information verification request (Step S46), and issues a session information verification response to PAN registration device 2 by way of SIP server 5 (Step S48). Session processor 234 of PAN registration device 2, having received the session information verification response, verifies that packet transfer settings have been completed based on the packet transfer response that is received from PAN control device 3, and then issues a communication route settings verification request by way of SIP server 5 to data distribution server 6 (Step S50). Data distribution server 6 receives the communication route settings verification request, verifies whether the settings of its own communication routes have been completed, and issues a communication route settings verification response to PAN registration device 2 by way of SIP server 5 (Step S52). Data distribution server 6 issues a session establishment response to PAN registration device 2 by way of SIP server 5, and thus completes the establishment of a session (Step S54).

Packet Transfer Process

Figure 14:
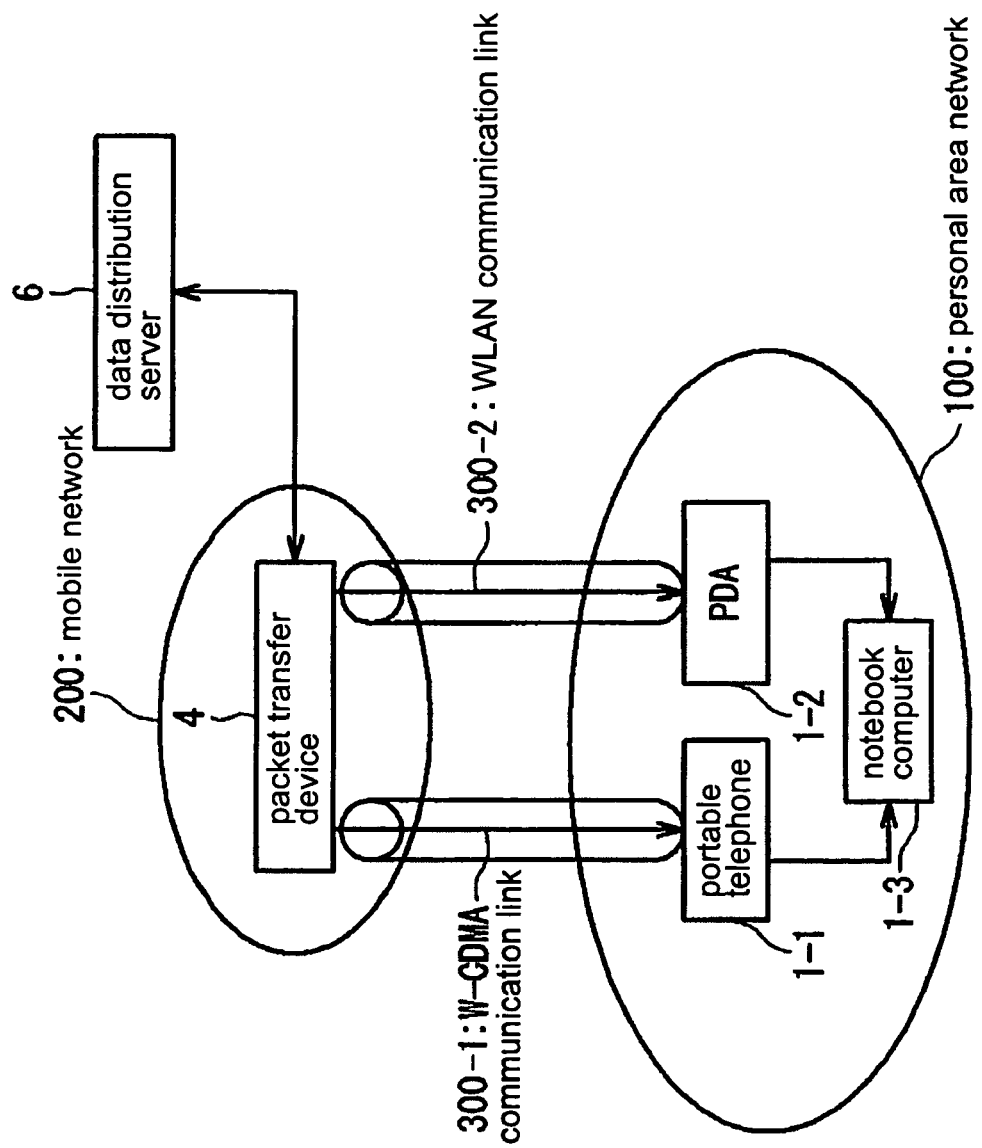
FIG. 14 is a block diagram of the packet transfer process in the first embodiment of the packet distribution system according to the present invention.
Figure 15:
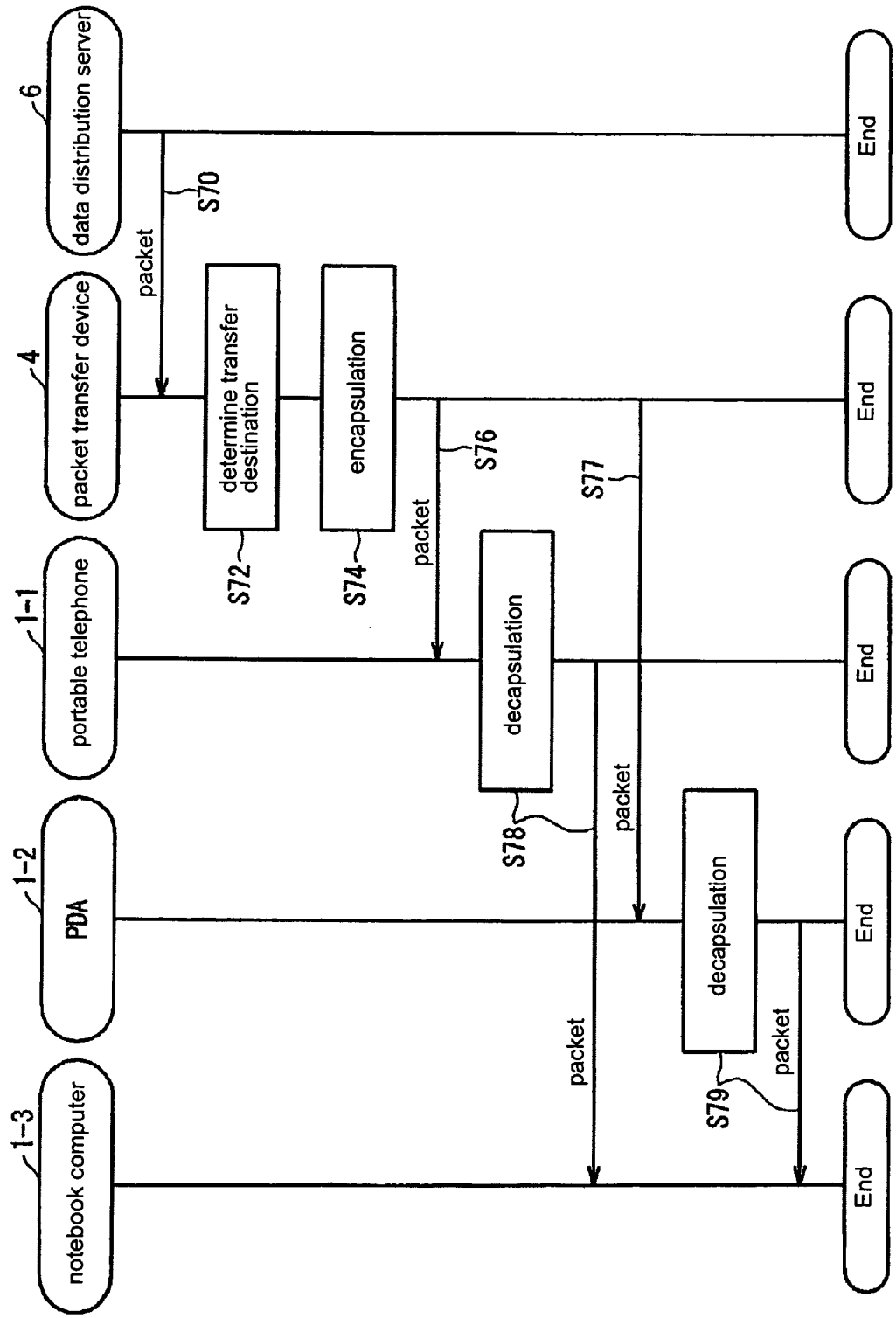
FIG. 15 is a sequence diagram of the packet transfer process in the first embodiment of the packet distribution system according to the present invention.
Figure 16:
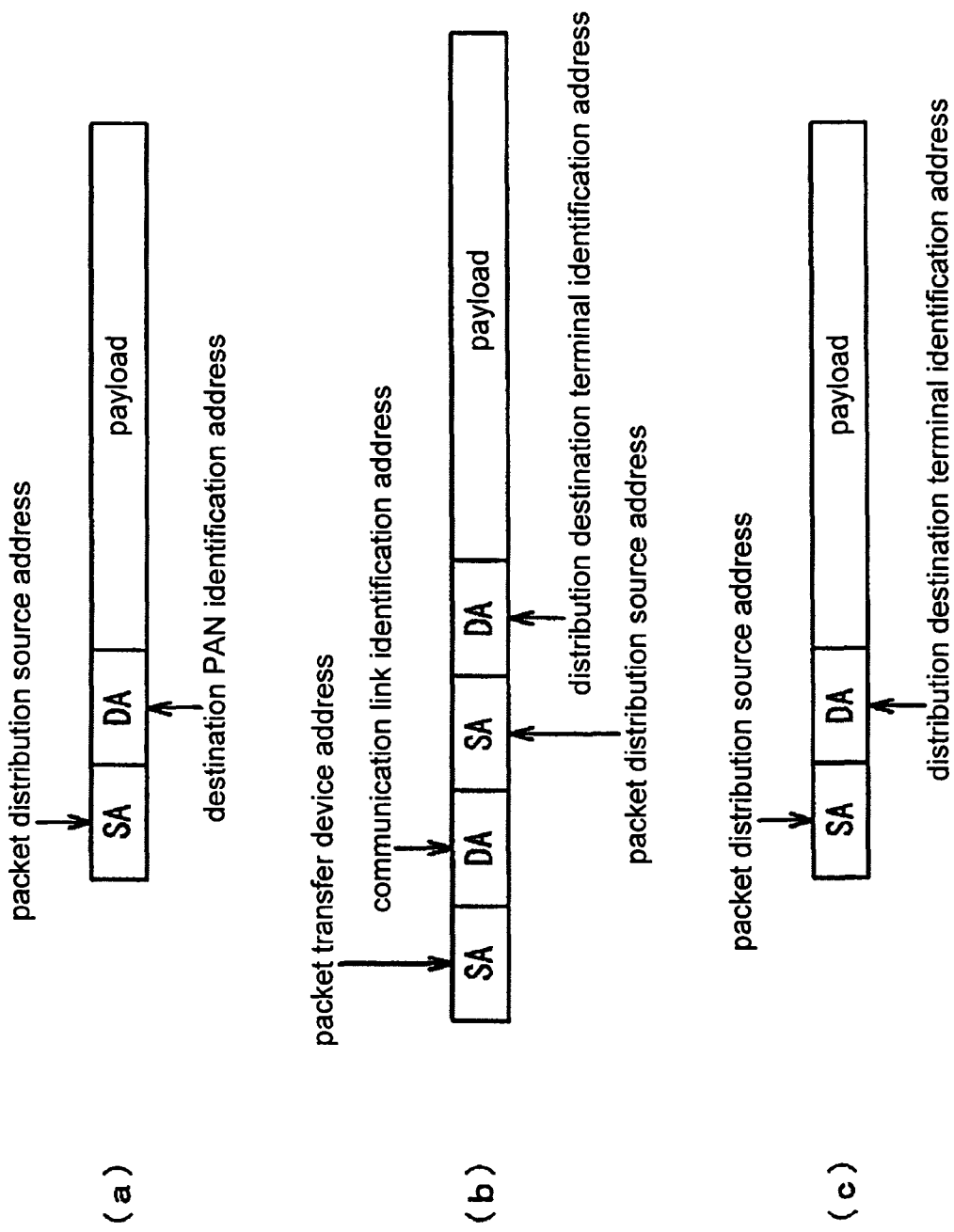
FIG. 16 is a conceptual view of packet data that are distributed in the packet distribution system according to the present invention.

The following explanation regards packet transfer in the streaming distribution of packet data that include moving picture data and speech data from data distribution server 6 to notebook computer 1-3 with reference to FIGS. 14 to 16.

FIG. 14 shows the flow of packet data in the packet transfer operation of the packet distribution system according to present invention. Packet data that are distributed from data distribution server 6 use the communication link that corresponds to media information 95, and packets are transferred to communication terminal 1 that is the distribution destination via communication terminal 1 that is connected to the communication link.

FIG. 15 shows a sequence diagram of the packet transfer process in the first embodiment of the packet distribution system according to the present invention. As shown in FIG. 16 (*a*), data distribution server 6 transmits to packet transfer device 4 packet data in which PAN identification address 91 (for example, IP_PAN#A) is designated in the destination address and the IP address of data distribution server 6 (for example, IPda#150) is designated in the source address (Step S70). Transfer processor 432 of packet transfer device 4, upon receiving the packet data from data distribution server 6, refers to the source address, destination address, and port number of the packet data; and when these match with the transmission source IP address, destination PAN identification address, and transmission source port number that are registered in the transfer settings, converts the destination address to the distribution destination terminal identification address (IPra#113 (notebook computer 1-3)) that corresponds to the destination PAN identification address ($IP_{13}$ PAN#A) (Step S72). Transfer processor 432 next refers to the payload type that is in the RTP header of the packet data and identifies media information 95 of the packet data, selects communication link identification address 94 and port number and transport protocol that correspond to each media information 95, designates the IP address of the packet transfer device itself in the source address, designates the communication link address that was selected in the destination address, and implements encapsulation (refer to FIG. 16 (*b*), Step S74). The packet data that have undergone encapsulation are transferred by way of the communication link that corresponds to this destination address and port number (Steps S76 and S77). For example, when the payload type of the packet data is "0," transfer processor 432 identifies the packet data as speech data, designates the communication link address (IPra#111 (portable telephone 1-1)) that corresponds to speech data in the destination address, encapsulates the packet data (Step S74), and transfers to portable telephone 1-1 by way of W-CDMA link 300-1 (Step S76). Alternatively, when the payload type is "31," the packet data are identified as moving picture data, communication link address (IPra#112 (PDA 1-2)) that corresponds to moving picture data is designated as the destination address, the packet data are subjected to encapsulation (Step S74) and then transferred to PDA 1-2 by way of WLAN link 300-2 (Step S77). Portable telephone 1-1, upon receiving speech packets that have undergone encapsulation, carries out decapsulation (refer to FIG. 16(*c*)), and transfers the speech packets to notebook computer 1-3 in accordance with the destination IP address (IPra#113) (Step S78). Alternatively, upon receiving the moving picture packets that have undergone encapsulation, PDA 1-2 carries out decapsulation (refer to FIG. 16(*c*)) and transfers the moving picture packets to notebook computer 1-3 in accordance with the destination IP address (IPra#113) (Step S79).

As described in the foregoing explanation, the packet distribution system according to the present invention allows packet distribution through the simultaneous selection of a plurality of communication links to one communication terminal that is present in a PAN. The packet distribution system according to the present invention further allows the transfer of packets in which the communication link that is appropriate to the media of the packet data is selected. Still further, data distribution server 6 that distributes packet data transmits packet data by designating PAN identification address 91 that is specific to PAN 100 as the destination, whereby data distribution can be realized without consideration for the distribution destination of the data.

Second Embodiment

The second embodiment of the packet distribution system according to the present invention is shown in FIGS. 3 to 10, and FIGS. 17 and 18.

Configuration

Referring to FIGS. 3 to 6, the configuration in the second embodiment of the packet distribution system according to the present invention is the same as that of the first embodiment with the exception of the substitution of communication partner terminal 6' for data distribution server 6. Communication partner terminal 6' is a terminal device such as an IP telephone terminal or a PC. In the second embodiment, an example is described in which a session establishment request is issued from communication partner terminal 6' that is connected to mobile network 200 to portable telephone 1-1 (terminal identification address 93 IPha#111), a session is established, and packet data are distributed.

Operation

The following explanation regards the operations in the second embodiment of the packet distribution system according to the present invention with reference to FIGS. 9 and 10, and FIGS. 17 and 18. In the present invention, explanation is divided between the four operations of: the registration of a PAN, the subscription of a terminal to a PAN, the initiation of communication, and the transfer of packets.

Processes for the Registration of a PAN and the Subscription of a Terminal to a PAN Referring to FIGS. 9 and 10, the PAN registration process and the subscription process of a terminal to a PAN in the second embodiment are identical to processes in the first embodiment, and redundant explanation is therefore omitted. In this case, PAN information such as shown in FIG. 7 (*a*) is registered in PAN information D/B 27 of PAN registration device 2.

Initiation of Communication

Figure 17:
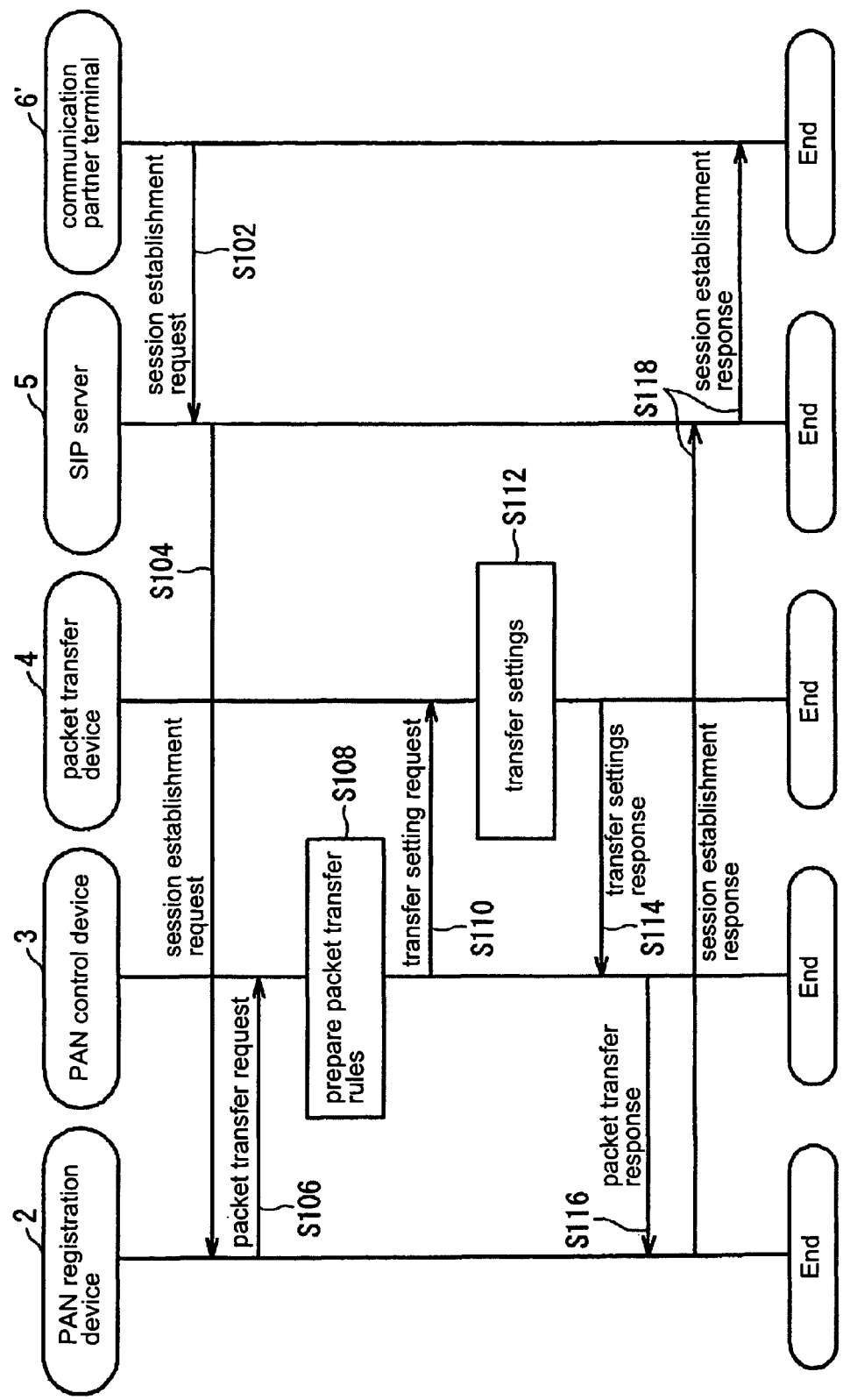
FIG. 17 is a sequence diagram of the communication initiation process in the second embodiment of the packet distribution system according to the present invention.

The following explanation regards the operation in the communication initiation process in the second embodiment with reference to FIG. 17. Communication partner terminal 6' first issues a session establishment request to SIP server 5 (Step S102). SIP server 5, upon receiving the session establishment request, transfers the session establishment request to PAN registration device 2 in accordance with the IP address that corresponds to the service identifier that is contained in the session establishment request (Step S104).

Session processor 234 of PAN registration device 2, upon receiving the session establishment request, transmits to PAN control device 3 a packet transfer request to which is added, for each flow that is included in the session, the IP address and port number of communication partner terminal 6', which is the distribution source of packets, terminal identification address 93 and the port number of the communication terminal that is the distribution destination of packets, and the communication link type (Step S106). In this case, for example, "IPda#151" is added as the distribution source address, "1235" is added as the port number of the distribution source, "IPha#111" is added as distribution destination terminal identification address 93, "3456" is added as the port number, and W-CDMA is added as the communication link type. Transfer rule preparation unit 332 of PAN control device 3, upon receiving the packet transfer request, prepares from the information that is included in the packet transfer request packet transfer rules 90 that place in correspondence: for each flow, PAN identification address 91, which is the destination address of streaming distribution; the IP address and port number of communication partner terminal 6' that is the distribution source of the packet data; terminal identification address 93 of the distribution destination of the packet data; communication link identification address 94 and port number that are used in packet transmission; and media information 95 that includes the transport protocol and media format list (Step S108). Referring to FIG. 8, packet transfer rules 90 place in correspondence, for example, "IP_PAN#A" as the destination PAN identification address; "IPda#151" as the distribution source IP address; "1235" as the port number of the distribution source; "IPha#111" of portable telephone 1-1 as the terminal identification address of the distribution destination; and further, places in correspondence "IPra#111, 3456" of portable telephone 1-1 as communication link identification address 94 and port number that are used in packet transfer, and payload type "0" as the corresponding media information 95. Transfer rule preparation unit 332 issues to packet transfer device 4 a packet transfer setting request that includes the transfer rules that have been prepared (Step S110). Transfer setting unit 431 of packet transfer device 4 stores packet transfer rules 90 that are included in the packet settings request that is received from PAN control device 3 in transfer setting D/B 48 and registers this information as transfer settings (Step S112). Upon completing the transfer settings, transfer setting unit 431 issues a transfer settings response to PAN control device 3 (Step S114). Transfer rule preparation unit 332 of PAN control device 3, upon receiving the transfer settings response, issues a packet transfer response to PAN registration device 2 (Step S116).

Session processor 234 of PAN registration device 2, upon receiving the packet transfer response, designates the distribution destination of the packets in PAN identification address 91 and issues a session establishment response to communication partner terminal 6' by way of SIP server 5, and thus completes the establishment of a session (Step S118).

Packet Transfer Process

Figure 18:
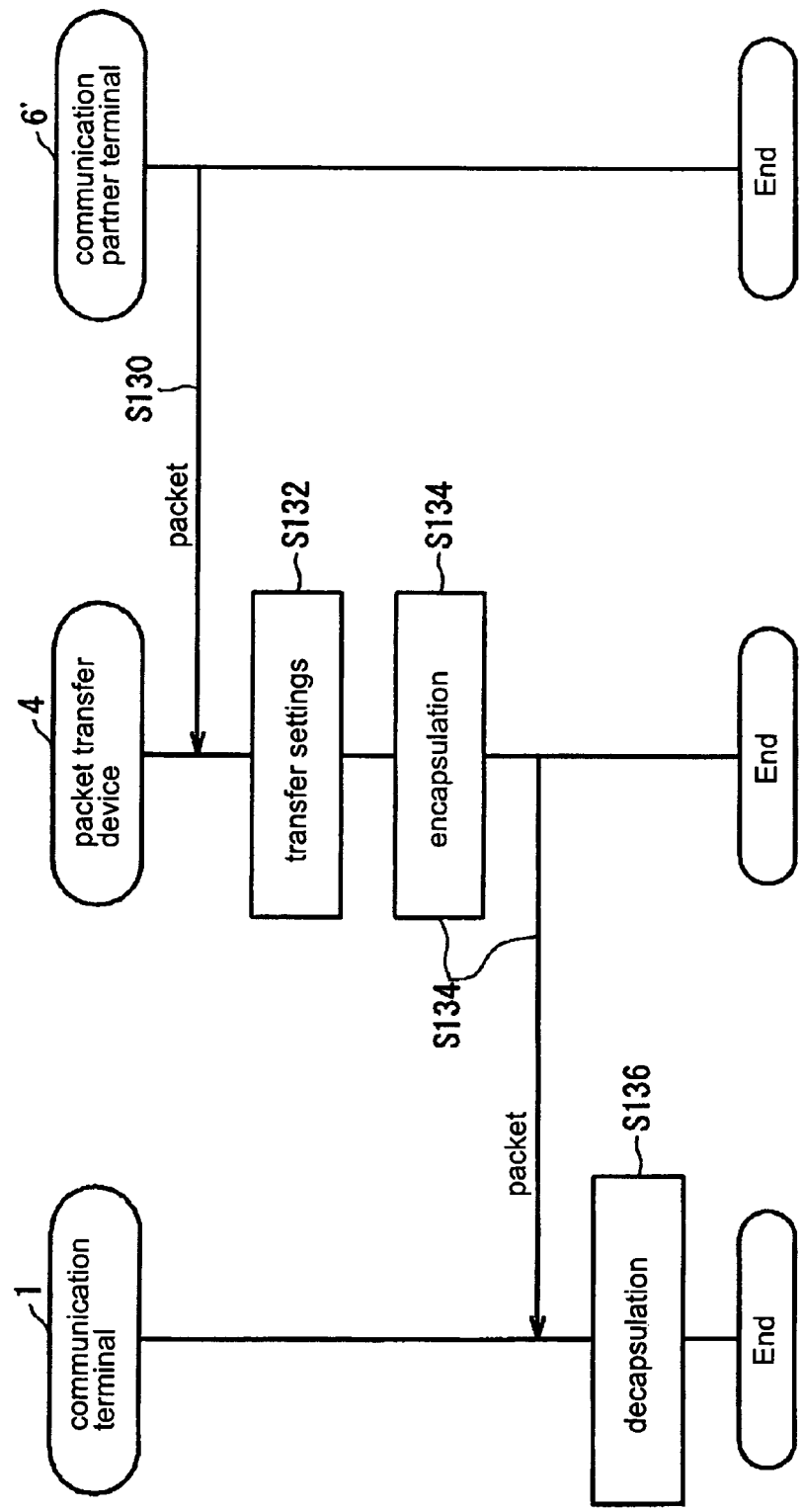
FIG. 18 is a sequence diagram of the packet transfer process in the second embodiment of the packet distribution system according to the present invention.

Referring to FIG. 18, a sequence diagram is shown of the packet transfer process in the second embodiment of the packet distribution system according to the present invention. As shown in FIG. 16(*a*), communication partner terminal 6' transmits packet data, for which PAN identification address 91 (for example IP_PAN#A) is designated in the destination address and the IP address of communication partner terminal 6' (for example, IPda#151) is indicated in the source address, to packet transfer device 4 (Step S130). Transfer processor 432 of packet transfer device 4, upon receiving the packet data from communication partner terminal 6', refers to the source address, the destination address, and port number of the packet data, and when these match with the transmission source IP address, destination PAN identification address, and transmission source port number that are registered in the transfer settings, converts the destination address to distribution destination terminal identification address (IPra#111 (portable telephone 1-1)) that corresponds to destination PAN identification address (IP$_{13}$ PAN#A) (Step S132). Transfer processor 432 next refers to the payload type that is in the RTP header of the packet data, identifies media information 95 of the packet data, selects communication link identification address 94, port number, and transport protocol that correspond to each media information 95, designates the IP address of the packet transfer device itself as the source address, designates the communication link address that was selected in the destination address, and implements encapsulation (refer to FIG. 16 (*b*)). The packet data that have undergone encapsulation are transferred by way of the communication links that correspond to the respective destination addresses and port numbers (Step S134). For example, when the payload type of the packet data is "0," transfer processor 432 identifies the packet data as speech data, designates the communication link address (IPra#111 (portable telephone 1-1)) that corresponds to speech data in the destination address, encapsulates the packet data (Step S134), and then transfers the data to portable telephone 1-1 by way of W-CDMA link 300-1 (Step S134). Portable telephone 1-1, upon receiving the speech data that have undergone encapsulation, implements decapsulation (refer to FIG. 16 (*c*)), and because the destination IP address is its own "IPra#111," processes the data as packet data addressed to itself (Step S136).

In the first and second embodiments, packet data can be also distributed to communication terminals 1 that can connect to mobile network 200 by a plurality of communication links by designating communication links that correspond to the media. For example, communication terminal 1 (terminal identification address 93 IPha#114) on PAN 100 (IP_PAN#B) that has PAN registration device 2 that holds the PAN information that is shown in FIG. 7 (*b*) has, as communication link identification addresses, 94IPra#114 that corresponds to speech data and IPra#115 that corresponds to moving picture data. When packet data that have been transmitted addressed to IP_PAN#B are transferred to this communication terminal, packet transfer device 4 converts the destination address from destination PAN identification address (IP_PAN#B) to distribution destination terminal identification address (IPra#114) based on the transfer settings that are shown in FIG. 8, implements encapsulation with speech packets as IPra#114 and moving picture packets as IPra#115, and transmits each of the packets to communication terminal 1 by way of the corresponding communication links. Communication terminal 1 decapsulates and uses each of the-packets that have been received. In this way, packets can be distributed to communication terminal 1 that is connected to mobile network 200 by way of a plurality of links by selecting links that accord with the media of the packet data.

Accordingly, the packet distribution system according to the present invention allows the transfer of packets to communication terminal 1 that is within PAN 100 that is connected to mobile network 200 by selecting communication links that accord with the application, and further, allows the transfer of packets to a specific communication terminal 1 within PAN 100 by simultaneously selecting a plurality of communication links that accord with applications.

In addition, in multimedia content distribution such as in streaming, the present invention can be applied to such uses as packet distribution control according to media type. The present invention can also be applied to uses such as a countermeasure for non-detection of radio waves by designating in packet transfer rules 90 communication links that are to be used in cases when radio wave cannot be detected.

Third Embodiment

The third embodiment of the packet distribution system according to the present invention is next described with reference to FIGS. 19 to 22.

Configuration

Figure 19:
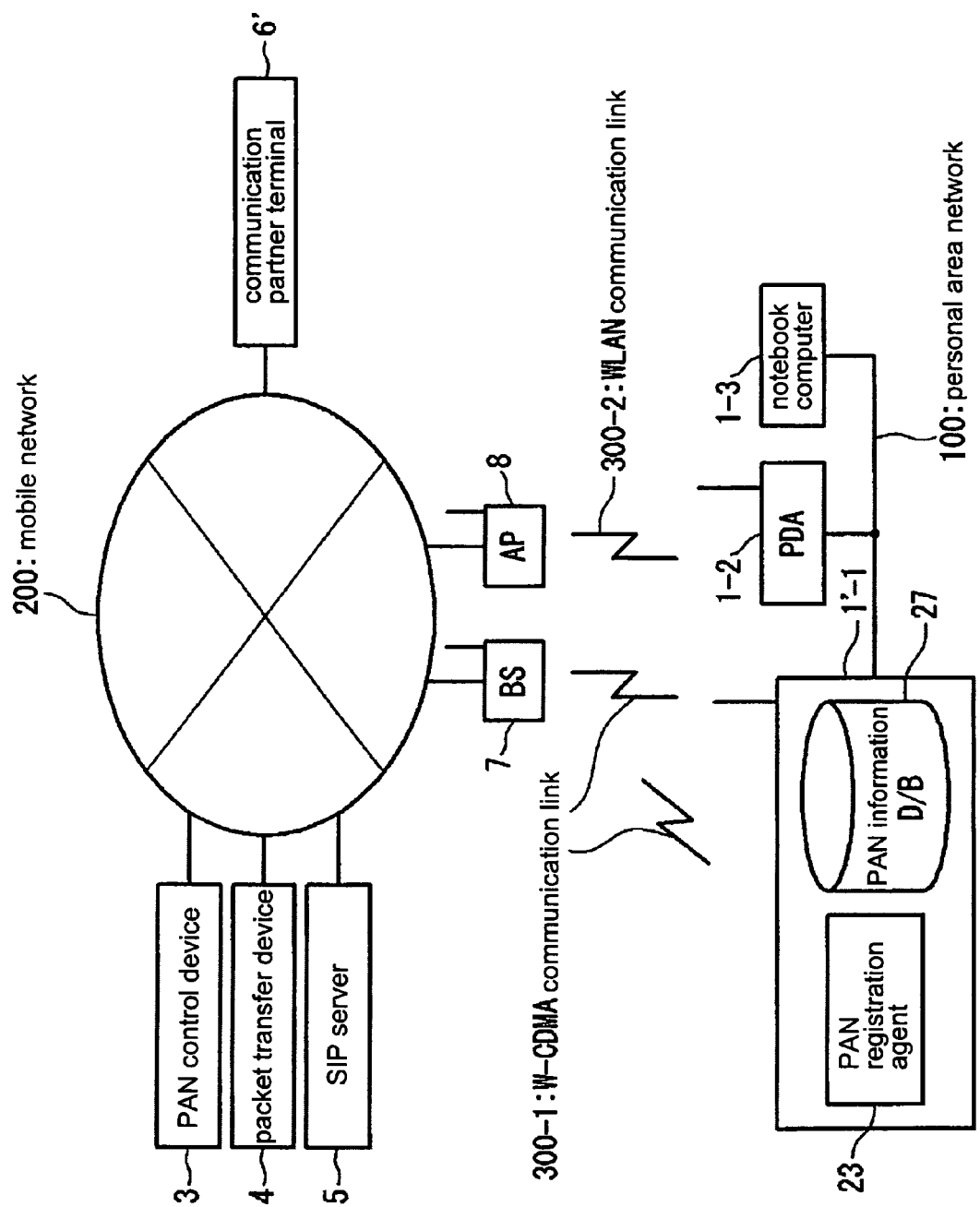
FIG. 19 shows the configuration in the third embodiment of the packet distribution system according to the present invention.

FIG. 19 shows the configuration in the third embodiment of the packet distribution system according to the present invention. The configuration of the packet distribution system in the present embodiment is a configuration in which PAN registration device 2 is deleted from the configuration in the second embodiment and that has been provided with communication terminal 1' (in this case, portable telephone 1'-1) that is provided with PAN registration agent 23 and PAN information D/B 27 in the second embodiment. In this case, terminal device identification address 93 and PAN identification address 94 of portable telephone 1'-1 in the present embodiment are the same address, and portable telephone 1'-1 is placed in correspondence with PAN identification address 94.

In the third embodiment, an example is described with portable telephone 1'-1 as communication terminal 1' and PDA 1-2 and notebook computer 1-3 as communication terminals 1. Communication terminals 1 and 1' hold terminal identification addresses 93 that are acquired from PAN registration agent 23 and communication link identification addresses 94 and are registered in PAN registration agent 23. In addition, communication terminals 1 and 1' hold connection interfaces with other communication terminals 1 (PAN interfaces) and connection interfaces with mobile network 200. Communication terminals 1 may further dispense with connection interfaces with mobile network 200 if they are able to connect by way of PAN 100 with other communication terminals 1 that hold connection interfaces with mobile network 200, for example, as in the case of notebook computer 1-3 that is shown in FIG. 3.

Operation

In the third embodiment, an example is described in which a session establishment request is issued from communication partner terminal 6' that is connected to mobile network 200 to, for example, portable telephone 1'-1 (terminal identification address 93 IPha# 111), a session is established, and packet data are distributed. The following explanation regards the operation in the third embodiment of the packet distribution system according to the present invention with reference to FIGS. 20 to 23. In the present invention, explanation is divided into the four operations of: registration of a PAN, subscription of a terminal to a PAN, initiation of communication, and packet transfer.

PAN Registration Process

When PAN 100 is newly formed, PAN registration agent 23 that is provided in portable telephone 1'-1 stores and registers, in PAN information D/B 361 of PAN control device 3, PAN identifier 92 and, as PAN identification address 91, terminal identification address 93 of portable telephone 1'-1 by the same operations as PAN registration agent 23 in the first embodiment. At this time, terminal identification address 93 of portable telephone 1'-1 and communication link identification address 94 of portable telephone 1'-1 are registered in association with each other.

Figure 20:
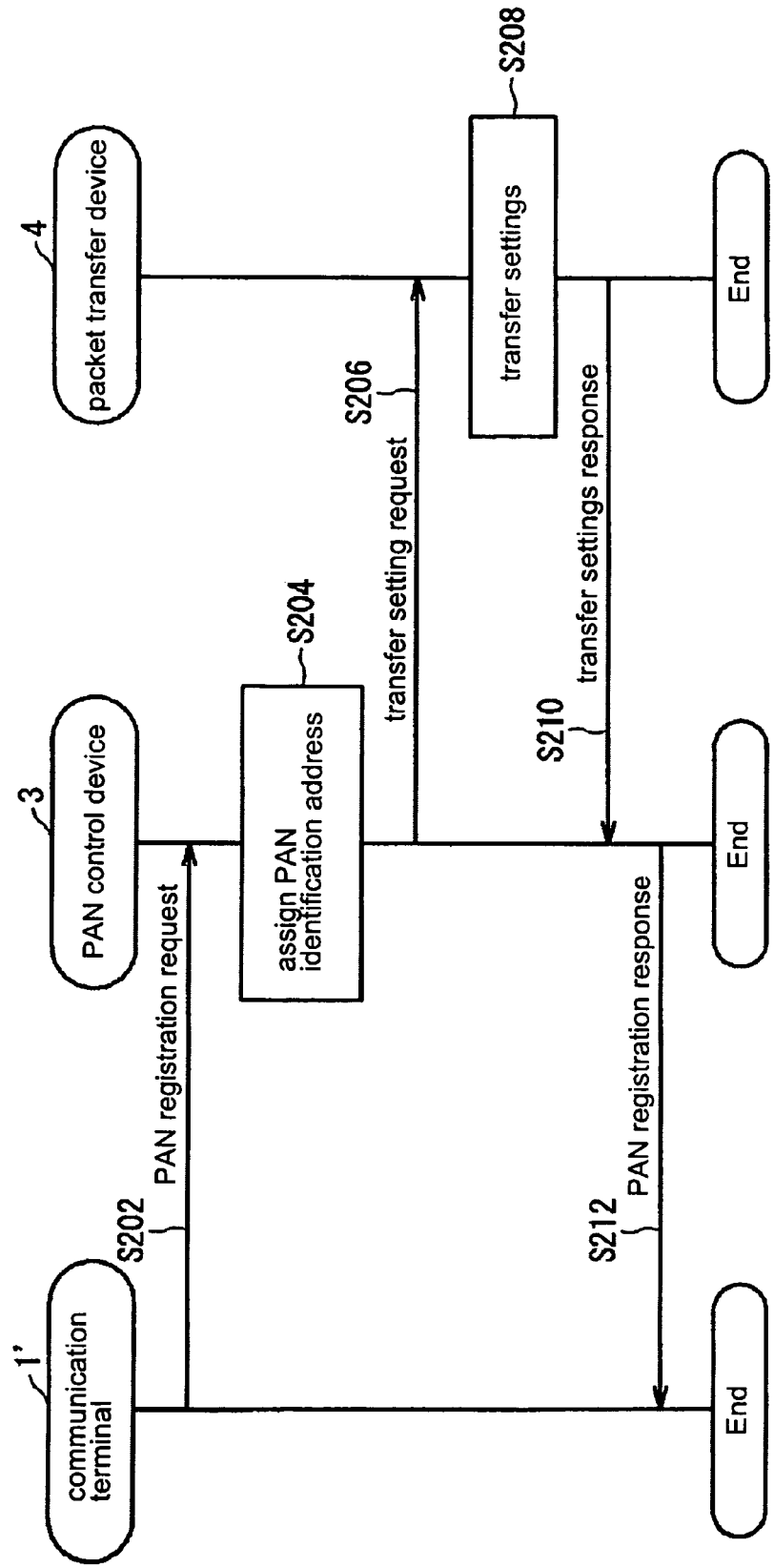
FIG. 20 is a sequence diagram of the PAN registration process in the third embodiment of the packet distribution system according to the present invention.

The operations for the PAN registration process are explained with reference to FIG. 20. When PAN 100 is newly formed, PAN registration unit 231 of portable telephone 1'-1 connects by way of W-CDMA communication link 300-1 to PAN control device 3 on mobile network 200 and both transmits communication link identification address 94 of portable telephone 1'-1 to PAN control device 3 and issues a PAN registration request to PAN control device 3 (Step S202). PAN registration unit 331 of PAN control device 3, upon receiving the PAN registration request, places communication link identification address 94 in PAN information D/B 361 in correspondence with terminal identification address 93 of portable telephone 1'-1 and assigns these addresses to PAN 100 that is newly registered (Step S204). PAN control device 3 next transmits to packet transfer device 4 terminal identification address 93 of portable telephone 1'-1 and communication link identification address 94 that have been placed in correspondence with each other and issues a transfer setting request to packet transfer device 4 (Step S206). Transfer setting unit 431 of packet transfer device 4 places this communication link identification address 94 of portable telephone 1'-1 in correspondence with terminal identification address 93 of portable telephone 1'-1 and registers these as default packet transfer rules in transfer settings D/B 48 (Step S208). Transfer setting unit 431, upon completing the transfer settings, issues a transfer settings response to PAN control device 3 (Step S210). Transfer rule preparation unit 332, having received the transfer settings response, issues a PAN registration response to portable telephone 1'-1 (Step S212). In this way, PAN registration agent 23 of portable telephone 1'-1 can set the transfer destination of packets to PAN 100 (communication link identification address 94 of portable telephone 1'-1).

Process for Subscription of a Terminal to a PAN

When a new communication terminal 1 connects to PAN 100, PAN registration agent 23 of portable telephone 1'-1 stores terminal identification address 93, communication link identification addresses 94, and the communication link types in PAN information D/B 27 of portable telephone 1'-1 by the same operation as PAN registration agent 23 in the first embodiment and thus realizes subscription and registration of new communication terminal 1.

Initiation of Communication

Figure 21:
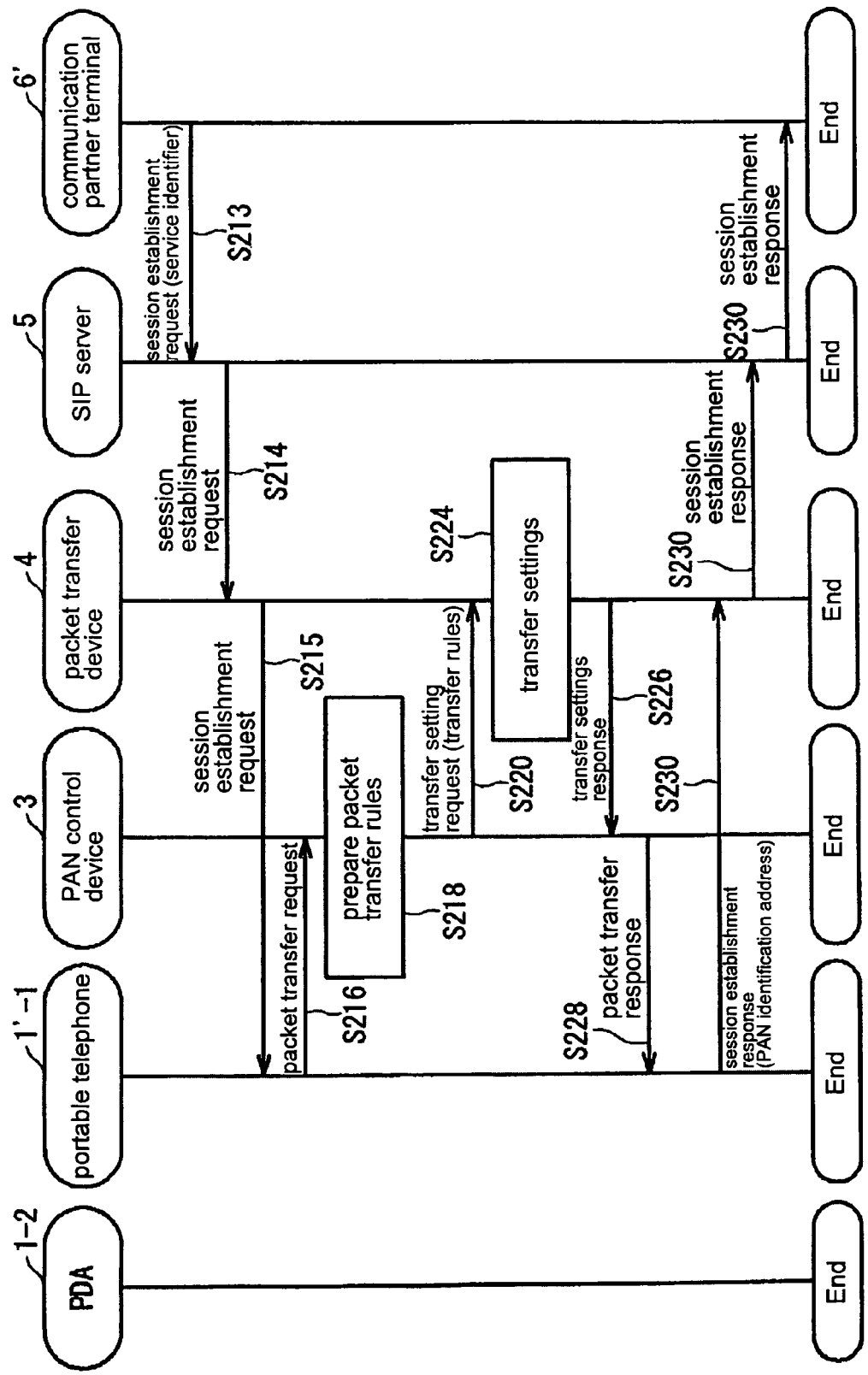
FIG. 21 is a sequence diagram of the communication initiation process in the third embodiment of the packet distribution system according to the present invention.

The following explanation regards the operation of the communication initiation process in the third embodiment with reference to FIG. 21. Communication partner terminal 6' first issues a session establishment request to SIP server 5 (Step S213). At this time, portable telephone 1'-1 is in a state in which the correspondence between a service identifier such as SIP-URI and terminal identification address 93 of portable telephone 1'-1 is registered to SIP server 5. SIP server 5, upon receiving the session establishment request, transfers the session establishment request to packet transfer device 4 in accordance with the IP address that corresponds to the service identifier that is contained in the session establishment request (Step S214). Packet transfer device 4 encapsulates IP in IP with communication link identification address 94 of portable telephone 1'-1 as the source address and the address of packet transfer device 4 as the destination address in accordance with the packet transfer rules that have been registered and transfers a session establishment request to portable telephone 1'-1 (Step S215).

Session processor 234 of portable telephone 1'-1, upon receiving the session establishment request, transmits to PAN control device 3 a packet transfer request to which is added, for each flow that is included in the session, the IP address and port number of communication partner terminal 6' that is the distribution source of the packets, terminal identification address 93 and the port number of communication terminal 1 that is the distribution destination of the packets, and the communication link type, as with session processor 234 in the first embodiment (Step S216).

As in the second embodiment, transfer rule preparation unit 332 of PAN control device 3 receives the packet transfer request and then prepares packet transfer rules 90 (Step S218). Transfer rule preparation unit 332 then issues a packet transfer setting request that includes the transfer rules that have been prepared to packet transfer device 4 (Step S220). Transfer setting unit 431 of packet transfer device 4 stores packet transfer rules 90 that are included in the packet setting request that is received from PAN control device 3 in transfer settings D/B 48 and registers these rules as the transfer settings (Step S224). Transfer setting unit 431 completes the transfer settings and then issues a transfer settings response to PAN control device 3 (Step S226). Transfer rule preparation unit 332 of PAN control device 3 receives the transfer settings response and then issues a packet transfer response to portable telephone 1'-1 (Step S228).

Session processor 234 of portable telephone 1'-1, upon receiving the packet transfer response, designates terminal identification address 93 of portable telephone 1'-1 as the distribution destination of the packets, issues a session establishment response to communication partner terminal 6' by way of SIP server 5, and thus completes the establishment of the session (Step S230). Terminal identification address 93 of portable telephone 1'-1 and PAN 100 are thus placed in correspondence as PAN identification address 91, and as a result, during communication, a packet transfer request can be transmitted to PAN control device 3 and the packet transfer destination altered similar to the operation for initiating communication.

Packet Transfer Process

Figure 22:
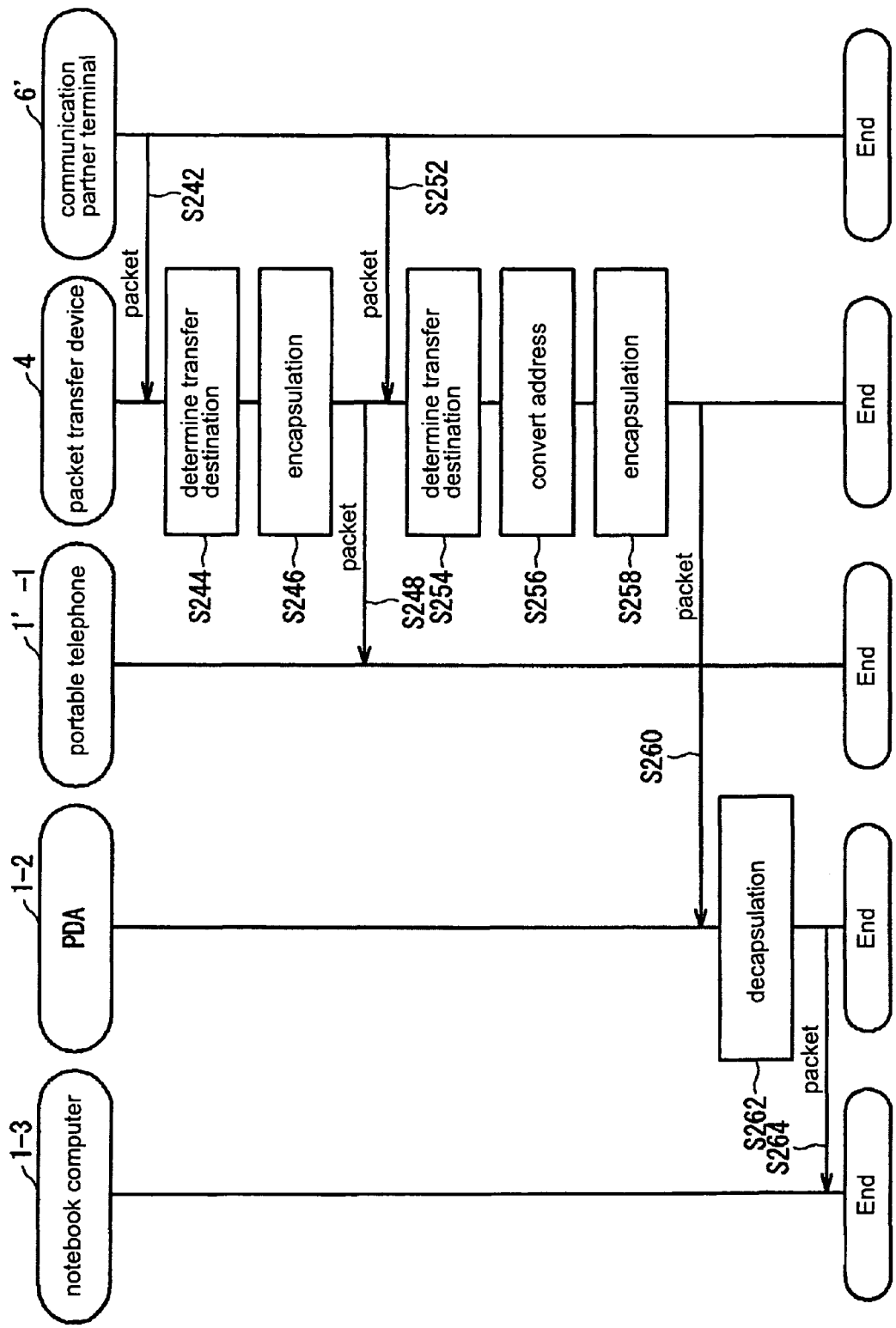
FIG. 22 is a sequence diagram of the packet transfer process in the third embodiment of the packet distribution system according to the present invention.

FIG. 22 shows a sequence diagram of the packet transfer process in the third embodiment of the packet distribution system according to the present invention.

Packet transfer device 4 in the present embodiment, upon receiving packets addressed to terminal identification address 93 of portable telephone 1'-1 from communication partner terminal 6' (Step S242), determines the transfer destination of the packets by filtering the flow identification information of the packets by means of the packet transfer rules (Step S244 and Step S254). When the transfer destination of the packets is portable telephone 1'-1 (source address: the address of communication partner terminal 6'; destination address:, terminal identification address of portable telephone 1'-1), packet transfer device 4 implements IP in IP encapsulation with communication link identification address 94 of portable telephone 1'-1 as the destination address and the address of packet transfer device 4 as the source address (Step S246) and transfers to portable telephone 1'-1.

When the transfer destination of packets that are transferred from communication partner terminal 6' is communication terminal 1 other than portable telephone 1'-1 (source address: the address of communication partner terminal 6'; destination address: the terminal identification address of portable telephone 1'-1), packet transfer device 4 converts the address of the destination to terminal identification address 93 of communication terminal 1 that is the transfer destination based on the transfer settings (Step S256), implements IP in IP encapsulation with communication link identification address 94 of communication terminal 1 as the destination address and the address of packet transfer device 4 as the source address (Step S258), and transfers to communication terminal 1 (Step S260). When the transfer destination is communication terminal 1 (for example, notebook computer 1-3) on PAN 100 that is not connected to mobile network 200, packet transfer device 4 converts the address of the destination to terminal identification address 93 of notebook computer 1-3 that is the transfer destination (Step S256), implements IP in IP encapsulation with communication link identification address 94 of PDA 1-2 as the destination address and the address of packet transfer device 4 as the source address (Step S258), and transfers to PDA 1-2 (Step S260). PDA 1-2 decapsulates the packets that have been transferred (Step S262), and transfers these packets (source address: the address of communication partner terminal 6';

destination address: the terminal identification address of notebook computer 1-3) to notebook computer 1-3 (Step S264).

Accordingly, in the third embodiment, terminal identification address 93 of communication terminal 1' that is provided with PAN registration agent 23 is assigned in place of PAN identification address 91 that was assigned to PAN 100 in the second embodiment, whereby session handover is possible between communication terminals 1 even when new PAN 100 is formed after the initiation of communication.

Fourth Embodiment

The fourth embodiment of a packet distribution system according to the present invention is described with reference to FIGS. 23 to 25.

Configuration

Figure 23:
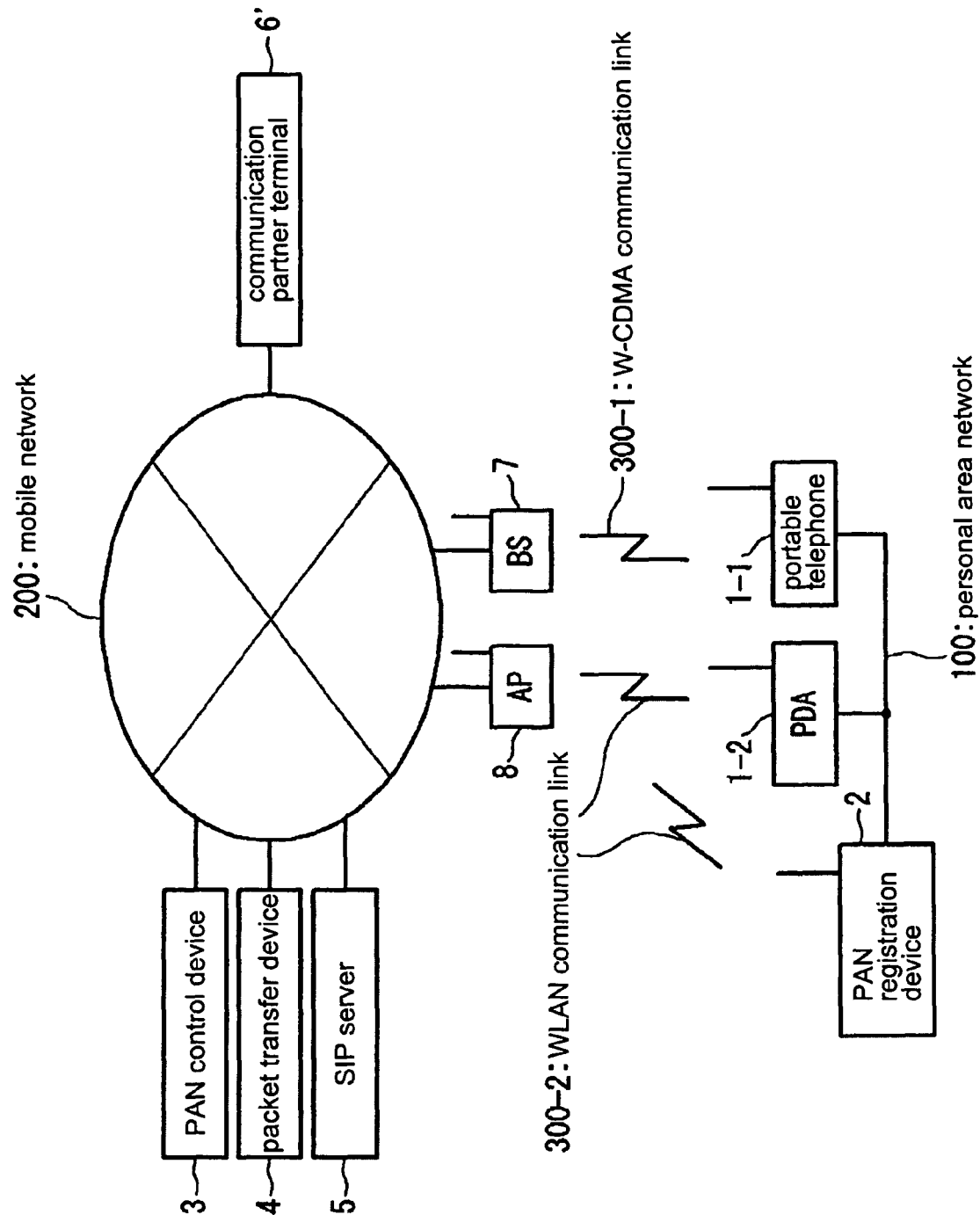
FIG. 23 shows the configuration in the fourth embodiment of the packet distribution system according to the present invention.
Figure 24:
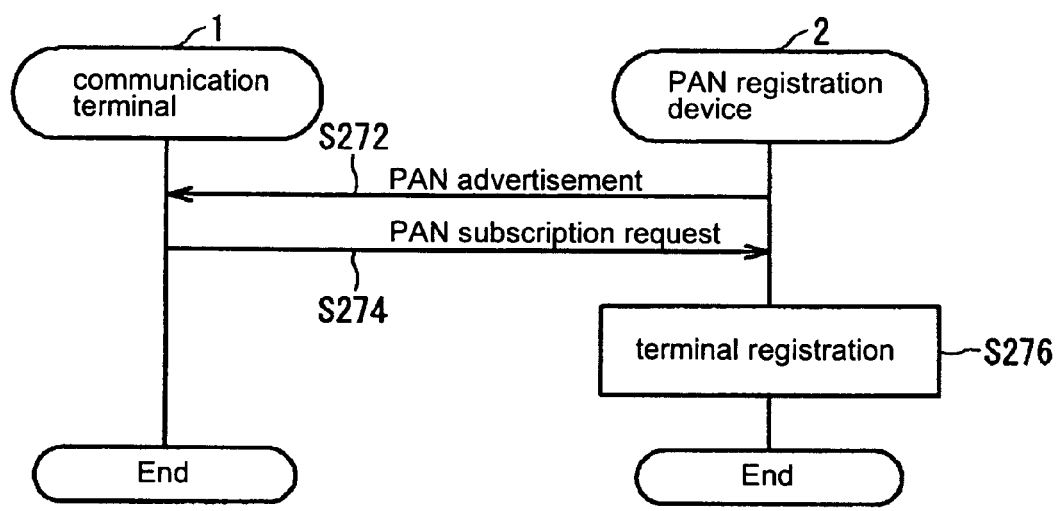
FIG. 24 is a sequence diagram of the process of subscription of a terminal to a PAN in the fourth embodiment of the packet distribution system according to the present invention.

FIG. 23 shows the configuration in the fourth embodiment of the packet distribution system according to the present invention. The configuration of the packet distribution system in the present embodiment is the configuration in the second embodiment with the exception of notebook computer 1-3. In other words, in the fourth embodiment, all communication terminals 1 that are connected to PAN 100 are communication terminals such as portable telephones and PDAs or notebook computers that are equipped with interfaces that can connect to mobile network 200. Communication terminals 1 in the fourth embodiment use global IP addresses in place of terminal identification addresses 93, and the composition of PAN information D/B 27 is global IP addresses in place of terminal identification addresses 93 that are shown in FIG. 7.

In the fourth embodiment, an example is described with portable telephone 1-1 and PDA 1-2 as communication terminals 1. Communication terminals 1 have connection interfaces with other communication terminals 1 (PAN interfaces) and a connection interface with one mobile network 200.

Operation

In the fourth embodiment, an example is described in which a session establishment request is issued to portable telephone 1-1 from communication partner terminal 6' that is connected to mobile network 200, a session is established, and packet data are distributed. The operations in the fourth embodiment of the packet distribution system according to the present invention are described with reference to FIGS. 24 and 25. In the present explanation, the description is divided into the four operations of: PAN registration, subscription of a terminal to a PAN, initiation of communication, and packet transfer.

PAN Registration Process

The PAN registration process in the fourth embodiment is the same as in the first embodiment, and explanation is therefore here omitted.

Process for Subscription of a Terminal to a PAN

The operations of the process of subscription of a terminal to PAN 100 in the fourth embodiment are described with reference to FIG. 24. Terminal registration unit 232 of PAN registration device 2 transmits a PAN advertisement that PAN identifier 92 has been added to PAN 100 (Step S272). In order to subscribe to PAN 100, communication terminal 1 that has received the PAN advertisement submits to PAN registration device 2 a PAN subscription request to which a PAN identifier, communication link identification address 94, and communication link type have been added (Step S274). PAN registration device 2 registers communication link identification address 94 and the communication link type. Terminal registration unit 232 of PAN registration device 2 verifies the PAN identifier that is received from communication terminal 1, and when this PAN identifier matches its own PAN identifier, stores communication link identification address 94 and the communication link type in association with each other as PAN information in PAN information D/B 27 (Step S276).

Initiation of Communication

The operations of the communication initiation process in the fourth embodiment are described with reference to FIG. 17. Communication partner terminal 6' first issues a session establishment request to SIP server 5 (Step S102). SIP server 5 receives the session establishment request and then transfers the session establishment request to PAN registration device 2 in accordance with the IP address that corresponds to service identifier that is contained in the session establishment request (Step S104.

Session processor 234 of PAN registration device 2 receives the session establishment request and then transmits to PAN control device 3, for each flow that is contained in a session, a packet transfer request to which are added the IP address and port number of communication partner terminal 6' that is the packet distribution source, communication link identification address 94 and port number of communication terminal 1 that is the packet distribution destination, and the communication link type (Step S106). Transfer rule preparation unit 332 of PAN control device 3 receives the packet transfer request and then prepares from information that is contained in the packet transfer request packet transfer rules 90 that place in correspondence, for each flow, PAN identification address 91 that is the destination address of the streaming distribution, the port number and the IP address of communication partner terminal 6' that is the distribution source of the packet data, communication link identification address 94 of the distribution destination of the packet data, the port number, and media information 95 that includes the transport protocol and media format list (Step S108). Transfer rule preparation unit 332 issues a packet transfer setting request that contains the transfer rules that have been prepared to packet transfer device 4 (Step S110). Transfer setting unit 431 of packet transfer device 4 stores packet transfer rules 90 that are contained in the packet settings request that is received from PAN control device 3 in transfer settings D/B 48 and registers these rules as the transfer settings (Step S112). Upon completing the transfer settings, transfer setting unit 431 issues a transfer settings response to PAN control device 3 (Step S114). Transfer rule preparation unit 332 of PAN control device 3 receives the transfer settings response and then issues a packet transfer response to PAN registration device 2 (Step S116).

Session processor 234 of PAN registration device 2, upon receiving the packet transfer response, designates the distribution destination of the packets in PAN identification address 91 and issues a session establishment response to communication partner terminal 6' by way of SIP server 5, and thus completes the establishment of the session (Step S118).

Packet Transfer Process

Figure 25:
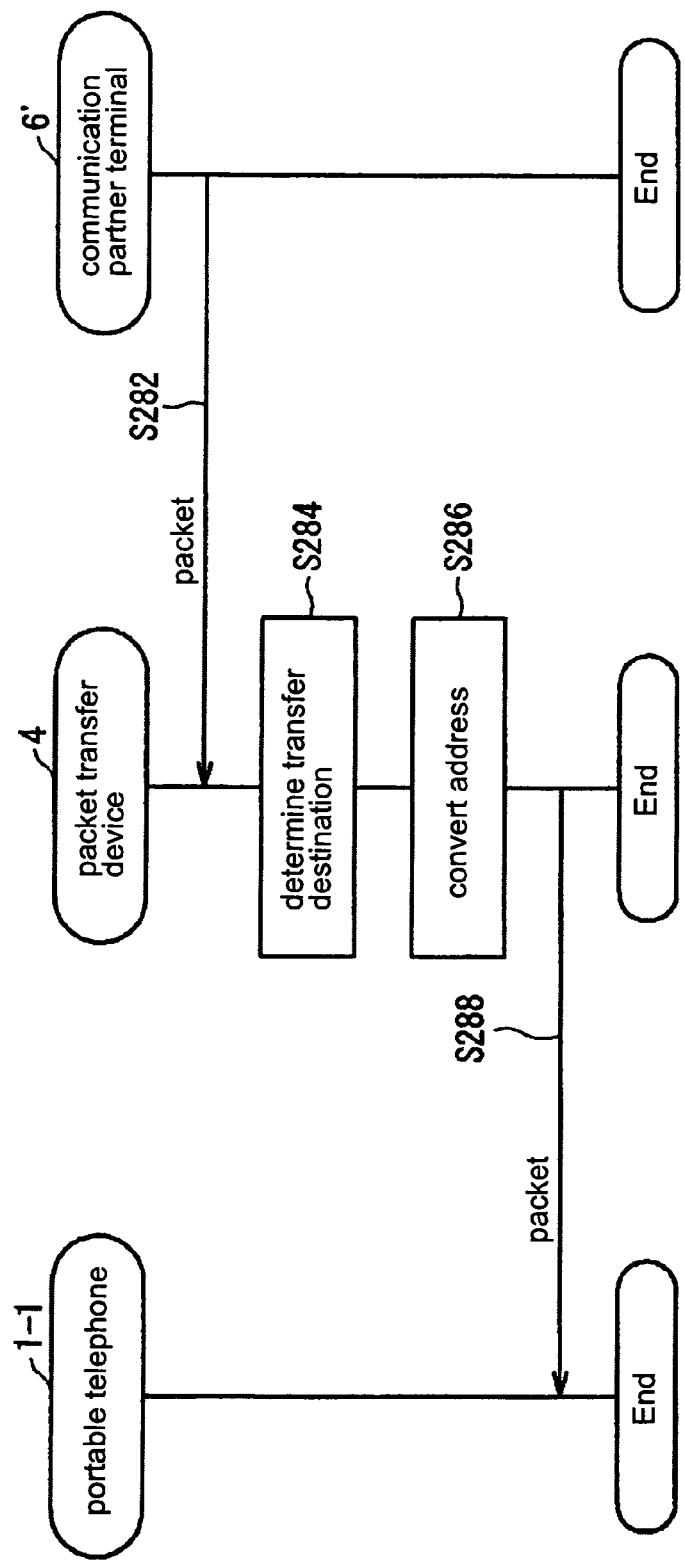
FIG. 25 is a sequence diagram of the packet transfer process in the fifth embodiment of the packet distribution system according to the present invention.

FIG. 25 shows a sequence diagram of the packet transfer process in the fourth embodiment of the packet distribution system according to the present invention. Packet transfer device 4 in the present embodiment, upon receiving packets from communication partner terminal 6' that are directed to a PAN identification address (Step S282), determines the transfer destination of the packets by using the packet transfer rules to filter the flow identification information of the packets (Step S284). When the transfer destination of the packets is portable telephone 1-1 (source address: the address of communication partner terminal 6'; destination address: the terminal identification address of portable telephone 1-1), packet transfer device 4 converts each of the addresses with communication link identification address 94 of portable telephone 1-1 as the destination address and packet transfer device 4 as the source address, and transmits to portable telephone 1-1.

In the fourth embodiment, all communication terminals 1 have global addresses, and the management of terminal identification addresses by PAN registration agent 23 is therefore unnecessary. In addition, the identification of communication terminal 1 and the identification of the communication link can be realized by only communication link identification address 94, and the header for encapsulation can therefore be deleted.

In addition, the present embodiment may be realized by communication terminal 1' that is provided with PAN registration agent 23 in place of PAN registration device 2. In this case, the PAN identification address that is placed in correspondence with PAN 100 and terminal identification address 93 of communication terminal 1' are identical, and communication partner terminal 6' transmits packets directed to terminal identification address 93 of communication terminal 1' as PAN identification address 91.

Although embodiments of the present invention have been described above in detail, the actual configuration is not limited to the above-described embodiments and modifications within range that does not depart from the gist of the invention are included in the present invention. Although a radio LAN was used in the connection of PAN registration device 2 and mobile network 200 in the present embodiments, other radio communication interfaces or cable line interfaces may be used.

While preferred embodiments of the present invention have been described using specific terms, such description is for illustrative purposes only, and it is to be understood that changes and variations may be made without departing from the spirit or scope of the following claims.

What is claimed is:

1. A packet distribution system comprising:
   a network;
   first communication terminals that are connected by way of one or more links to said network;
   a packet transfer device that is connected to said network for determining links that correspond to payload information of packet data that are received by way of the network, and for transferring said packet data to said first communication terminals by way of said links;
   a personal area network (PAN) that is connected to said first communication terminals;
   a PAN control device that is connected to said network, which prepares packet transfer rules that place communication link identification addresses in correspondence with said payload information, and transmits said packet transfer rules to said packet transfer device; and
   a PAN registration device that is connected to said personal area network for acquiring said communication link identification addresses from said first communication terminals by way of said personal area network, wherein:
   said PAN registration device is connected to said PAN control device by way of said network, and transmits said communication link identification addresses, and
   said packet transfer device refers to said packet transfer rules, designates as the destination addresses the communication link identification addresses that correspond to the payload information of the packet data that are received by way of said network, encapsulates said packet data, and transfers said packet data to said first communication terminals by way of the links that correspond to said communication link identification addresses.

2. A packet distribution system according to claim 1, wherein:
   said PAN registration device confers terminal identification addresses to said first communication terminals by way of said personal area network, acquires PAN identification addresses that are specific to said personal area network from said PAN control device by way of said network, and transmits said terminal identification addresses to said PAN control device;
   said PAN control device prepares packet transfer rules that place said PAN identification addresses, said terminal identification addresses, and said payload information in correspondence; and transmits these packet transfer rules by way of said network to said packet transfer device; and
   said packet transfer device refers to said packet transfer rules, and when the destination addresses of packet data that are received by way of said network match with said PAN identification addresses, converts said destination addresses to said terminal identification addresses that correspond to said PAN identification addresses, designates as the destination addresses the communication link identification addresses that correspond to said PAN identification addresses and said payload information, encapsulates the packet data for which said destination addresses have been altered, and transfers said packet data to said first communication terminals by way of said links that accord with said communication link identification addresses.

3. A packet distribution system according to claim 2, further comprising:
   second communication terminals that are connected to said personal area network; wherein:
   said first communication terminals decapsulate said encapsulated packet data that are received by way of said links and refer to destination addresses; and, based on said terminal identification addresses, transfer said decapsulated packet data to said second communication terminals by way of said personal area network.

4. A packet distribution system according to claim 1, further comprising:
   said packet distribution system is communication partner terminals that are connected to said network for transmitting to said packet transfer device packet data in which said PAN identification addresses are designated as the destination addresses, and the communication partner terminal addresses, which are their own addresses, are designated as the source addresses; wherein:
   said communication partner terminals transmit said communication partner terminal addresses as session information to said PAN registration device by way of said network;
   said PAN registration device places said PAN identification addresses, said terminal identification addresses, and said communication partner terminal addresses in correspondence and transmits to said PAN control device;
   said PAN control device prepares packet transfer rules in which said PAN identification addresses, said terminal identification addresses, and the addresses of said communication partner terminals are placed in correspondence, and transmits said packet transfer rules by way of said network to said packet transfer device; and said packet transfer device: refers to said packet transfer rules; converts said destination addresses to said terminal identification addresses that correspond to said PAN identification addresses that match with the destination addresses of packet data that are received by way of said network and said communication partner terminal addresses that match with the source addresses of said packet data; designates as the destination addresses the communication link identification addresses that correspond to said PAN identification addresses and said payload information; encapsulates the packet data for which said destination addresses have been altered; and transfers said packet data to said first communication terminals by way of links that accord with the communication link identification addresses.

5. A packet distribution system according to claim 4, further comprising:

second communication terminals that are connected to said personal area network; wherein:

said first communication terminals decapsulate said encapsulated packet data that are received by way of said links and refer to destination addresses; and, based on said terminal identification addresses, transfer said decapsulated packet data to said second communication terminals by way of said personal area network.

6. A packet distribution system according to claim 1, wherein said payload information is media information of packet data.

7. A packet distribution system according to claim 1, wherein said network is a mobile network.

8. A packet transfer device, comprising:

a network interface for connecting to a network;

a PAN interface for connecting to a personal area network by way of a link;

a transfer settings database for storing packet transfer rules that place in correspondence PAN identification addresses that are received by way of said network, terminal device identification addresses, link identification addresses, and payload information of packet data; and a transfer processor for, when the destination addresses of packet data that are received by way of said network match with said PAN identification address, converting said destination addresses to said terminal identification addresses that correspond to said PAN identification address, designating as the destination addresses the communication link identification addresses that correspond to said PAN identification address and payload data that are contained in said packet data, encapsulating packet data for with said destination addresses have been altered, and transferring said packet data to communication terminals on said personal area network by way of links that accord with said communication link identification addresses.

9. A packet distribution method comprising:

receiving packet data;

determining links that correspond to payload information that is contained in said packet data; and transferring said packets to first communication terminals on a personal area network by way of said links, wherein:

a PAN registration device acquires communication link identification addresses from said first communication terminals by way of a personal area network, a PAN control device prepares packet transfer rules in which said communication link identification addresses and said payload information are placed in correspondence and transmits said packet transfer rules to a packet transfer device on a network, wherein:

said PAN registration device transmits to said PAN control device on a network packet transfer requests in which said communication link identification addresses are placed in correspondence with payload information;

said packet transfer device refers to said packet transfer rules, designates as the destination addresses communication link identification addresses that correspond to payload information of packet data that are received by way of said network, and encapsulates said packet data; and said packet transfer device transfers said packet data that have been encapsulated to said first communication terminals by way of links that correspond to said communication link identification addresses.

10. A packet distribution method comprising the steps of:

receiving packet data;

determining links that correspond to payload information that is contained in said packet data; and transferring said packets to first communication terminals on a personal area network by way of said links, wherein:

a PAN registration device confers terminal identification addresses to said first communication terminals by way of said personal area network;

said PAN registration device acquires a PAN identification address that is specific to said personal area network from said PAN control device by way of said network; and said PAN registration device transmits said terminal identification addresses to the PAN control device;;

wherein:

said step wherein said PAN control device prepares and transmits packet transfer rules is provided with a step wherein said PAN control device further places said PAN identification addresses in correspondence in said packet transfer rules;

said step wherein said packet transfer device encapsulates said packet data is provided with a step wherein said packet transfer device refers to said packet transfer rules, and when the destination addresses of packet data that are received by way of said network match with said PAN identification addresses, converts said destination addresses to said terminal identification addresses that correspond to said PAN identification addresses; and said packet transfer device designates as the destination addresses said PAN identification addresses and the communication link identification addresses that correspond to said payload information and encapsulates packet data for which said destination addresses have been altered.

11. A packet distribution method according to claim 10, wherein:

said first communication terminals decapsulate said encapsulated packet data that have been received by way of said links, refers to the destination addresses, and based on said terminal identification addresses, transfers said decapsulated packet data to second communication terminals by way of said personal area network.

12. A packet distribution method comprising the steps of:

receiving packet data;

determining links that correspond to payload information that is contained in said packet data; and transferring said packets to first communication terminals on a personal area network by way of said links,
wherein:
communication partner terminals designate said PAN identification addresses as destination addresses, designate communication partner terminal addresses that are their own addresses as source addresses, and transmit said packet data to said packet transfer device;
said communication partner terminals transmit said communication partner terminal addresses as session information to said PAN registration device by way of said network;
said PAN registration device places said PAN identification addresses, said terminal identification addresses, and said communication partner terminal addresses in correspondence and transmits to said PAN control device;
said PAN control device prepares packet transfer rules in which said PAN identification addresses, said terminal identification addresses, and addresses of said communication partner terminals are placed in correspondence and transmits to said packet transfer device by way of said network; and
said packet transfer device: refers to said packet transfer rules, converts said destination addresses to said terminal identification addresses that correspond to said PAN identification addresses that match with the destination addresses of packet data that are received by way of said network and said communication partner terminal addresses that match with the source addresses of said packet data, designates as the destination addresses communication link identification addresses that correspond to said PAN identification addresses and said payload information, encapsulates packet data for which said destination addresses have been altered, and transfers said packet data to said first communication terminals by way of links that accord with said communication link identification addresses.

13. A packet distribution method according to claim 12, wherein:
said first communication terminals decapsulate said encapsulated packet data that have been received by way of said links, refers to the destination addresses, and based on said terminal identification addresses, transfers said decapsulated packet data to second communication terminals by way of said personal area network.

14. A packet distribution system comprising:
a network:,
first communication terminals that are connected by way of one or more links to said network;
a packet transfer device that is connected to said network for determining links that correspond to payload information of packet data that are received by way of the network, and for transferring sand packet data to said first communication terminals by way of said links;
a personal area network (PAN) that is connected to said first communication terminals; and
a PAN control device that is connected to said network, which prepares packet transfer rules that place communication link identification addresses in correspondence with said payload information, and transmits said packet transfer rules to said packet transfer device,
wherein:
said first communication terminals are connected to said PAN control device by way of said network and transmit said communication link identification addresses that have been placed in correspondence with said links to said PAN control device; and said packet transfer device refers to said packet transfer rules, designates as destination addresses said communication link identification addresses that correspond to the payload information of packet data that are received by way of said network, encapsulates said packet data, and transfers said packet data to said first communication terminals by way of said links that correspond to said communication link identification addresses.

15. A packet distribution system according to claim 14, wherein:
said first communication terminals place in correspondence: as addresses that are specific to said personal area networks, first terminal identification addresses that identify themselves, and transmit these addresses to said PAN control device;
said PAN control device prepares packet transfer rules in which said first terminal addresses and said payload information are placed in correspondence and transmits said packet transfer rules to said packet transfer device by way of said network; and
said packet transfer device: refers to said packet transfer rules; and when the destination addresses of packet data that are received by way of said network match with said first terminal identification addresses, designates as destination addresses said first terminal identification addresses and communication link identification addresses that correspond to said payload information; encapsulates said packet data; and transfers said packet data to said first communication terminals by way of links that accord with said communication link identification addresses.

16. A packet distribution system according to claim 15, further comprising:
second communication terminals that are connected to said personal area network;
wherein
said first communication terminals decapsulate said encapsulated packet data that are received by way of said links, refer to the destination addresses, and based on said terminal identification addresses, transfer said decapsulated packet data to said second communication terminals by way of said personal area network.

17. A packet distribution system according to claim 14, further comprising:
second communication terminals and third communication terminals that are connected to said first communication terminals by way of said personal area network;
wherein:
said second communication terminals are connected to said network by way of second links and are assigned second link identification addresses that correspond to said links,
said first communication terminals place in correspondence and register in said PAN control device third terminal identification addresses that identify said third communication terminals and said second communication terminals;
said PAN control device prepares packet transfer rules in which said third terminal identification addresses, said second link identification addresses, and said payload information are placed in correspondence, and transmits said packet transfer rules to said packet transfer device by way of said network;
said packet transfer device refers to said packet transfer rules, and when the destination addresses of packet data that are received by way of said network match with said first terminal identification addresses, converts said first terminal identification addresses to said third terminal identification addresses that correspond to said payload information, designates as destination addresses second communication link identification addresses that correspond to said payload information, encapsulates packet data for which said destination addresses have been converted, and transfers said packet data to said second communication terminals by way of second links that accord with said second communication link identification addresses; and said second communication terminals decapsulate said encapsulated packets and, based on said third terminal identification addresses, transmits said packets to said third communication terminals.

18. A packet distribution system according to claim 17, further comprising:

second communication terminals that are connected to said personal area network;

wherein said first communication terminals decapsulate said encapsulated packet data that are received by way of said links, refer to the destination addresses, and based on said terminal identification addresses, transfer said decapsulated packet data to said second communication terminals by way of said personal area network.

19. A packet distribution system according to claim 14, wherein said payload information is media information of packet data.

20. A packet distribution system according to claim 14, wherein said network is a mobile network.

21. A packet distribution system comprising:

a network;

first communication terminals that are connected by way of one or more links to said network;

a packet transfer device that is connected to said network for determining links that correspond to payload information of packet data that are received by way of the network, and for transferring said packet data to said first communication terminals by way of said links;

a personal area network (PAN) that is connected to said first communication terminals;

a PAN control device that is connected to said network, which prepares packet transfer rules that place communication link identification addresses in correspondence with said payload information, and transmits said packet transfer rules to said packet transfer device; and a PAN registration device that is connected to said personal area network for acquiring said communication link identification addresses that have been placed in correspondence with said links from said first communication terminals by way of said personal area network, wherein said PAN registration device is connected to said PAN control device by way of said network and transmits said communication link identification addresses; and said packet transfer device refers to said packet transfer rules, converts the destination addresses to communication link identification addresses that correspond to the payload information of packet data that are received by way of said network, and transfers said packet data to said first communication terminals by way of links that correspond to said communication link identification addresses.

22. A packet distribution system according to claim 21, wherein:

said PAN registration device transmits to said PAN control device PAN identification addresses as addresses that are specific to said personal area network;

said PAN control device prepares packet transfer rules in which said PAN identification addresses and said payload information are placed in correspondence and transmits said packet transfer rules to said packet transfer device by way of said network; and said packet transfer device refers to said packet transfer rules, and when the destination addresses of packet data that are received by way of said network match with said PAN identification addresses, converts the destination addresses to said communication link identification addresses that correspond to said PAN identification addresses and said payload information, and transfers said packet data to said first communication terminals by way of links that accord with said communication link identification addresses.

23. A packet distribution system according to claim 21, wherein said payload information. is media information of packet data.

24. A packet distribution system according to claim 21, wherein said network is a mobile network.

* * * * *